US009008222B2

(12) United States Patent
Stirling-Gallacher et al.

(10) Patent No.: US 9,008,222 B2
(45) Date of Patent: Apr. 14, 2015

(54) MULTI-USER AND SINGLE USER MIMO FOR COMMUNICATION SYSTEMS USING HYBRID BEAM FORMING

(71) Applicant: Samsung Electronics Co., Ltd, Suwon-si, Gyeonggi-do (KR)

(72) Inventors: Richard Stirling-Gallacher, Dallas, TX (US); Kaushik Morapakkam Josiam, Dallas, TX (US); Sridhar Rajagopal, Plano, TX (US); Young-Han Nam, Richardson, TX (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 13/964,898

(22) Filed: Aug. 12, 2013

(65) Prior Publication Data

US 2014/0050280 A1    Feb. 20, 2014

Related U.S. Application Data

(60) Provisional application No. 61/683,024, filed on Aug. 14, 2012.

(51) Int. Cl.
*H04B 7/06* (2006.01)
*H04B 7/04* (2006.01)

(52) U.S. Cl.
CPC ............ *H04B 7/0486* (2013.01); *H04B 7/0469* (2013.01); *H04B 7/0617* (2013.01); *H04B 7/0452* (2013.01)

(58) Field of Classification Search
USPC ......... 375/259, 260, 267, 285, 295, 296, 299, 375/316, 346, 347, 349
See application file for complete search history.

(56) References Cited

U.S. PATENT DOCUMENTS

| | | | |
|---|---|---|---|
| 7,450,066 B2* | 11/2008 | Haskell | 342/368 |
| 2006/0128310 A1 | 6/2006 | Leabman | |
| 2011/0199986 A1 | 8/2011 | Fong et al. | |
| 2011/0218016 A1 | 9/2011 | Hirakawa et al. | |
| 2011/0249637 A1* | 10/2011 | Hammarwall et al. | 370/329 |

(Continued)

FOREIGN PATENT DOCUMENTS

WO    WO 2012/0099516 A1    7/2012

OTHER PUBLICATIONS

International Search Report dated Nov. 27, 2013 in connection with International Patent Application No. PCT/KR2013/007318, 5 pages.

(Continued)

*Primary Examiner* — Siu Lee

(57) ABSTRACT

A station in a wireless communication system includes a processor circuitry configured to form at least a first plurality of data streams and a second plurality of data streams, and a digital precoder configured to receive the first plurality of data streams and the second plurality of data streams. The wireless station can further include a plurality of radio frequency (RF) beamforming chains connected to the digital precoder and configured to form at least one RF envelope, wherein the digital precoder is configured to steer a plurality of digital beams within the at least one RF beam envelope, the digital beams forming a plurality of spatially distinct paths for the first plurality of data streams and a plurality of spatially distinct paths for the second plurality of data streams, and a plurality of antennas operably connected to the RF beamforming chains.

23 Claims, 19 Drawing Sheets

(56) References Cited

U.S. PATENT DOCUMENTS

| | | | |
|---|---|---|---|
| 2011/0280341 A1* | 11/2011 | Rofougaran | 375/302 |
| 2012/0076236 A1 | 3/2012 | Ko et al. | |
| 2012/0087400 A1 | 4/2012 | Kim et al. | |
| 2013/0044650 A1* | 2/2013 | Barker et al. | 370/278 |
| 2013/0093624 A1* | 4/2013 | Raczkowski et al. | 342/368 |
| 2013/0308717 A1* | 11/2013 | Maltsev et al. | 375/267 |
| 2014/0003481 A1* | 1/2014 | Keusgen et al. | 375/227 |

OTHER PUBLICATIONS

Written Opinion of International Searching Authority dated Nov. 27, 2013 in connection with International Patent Application No. PCT/KR2013/007318, 8 pages.

* cited by examiner

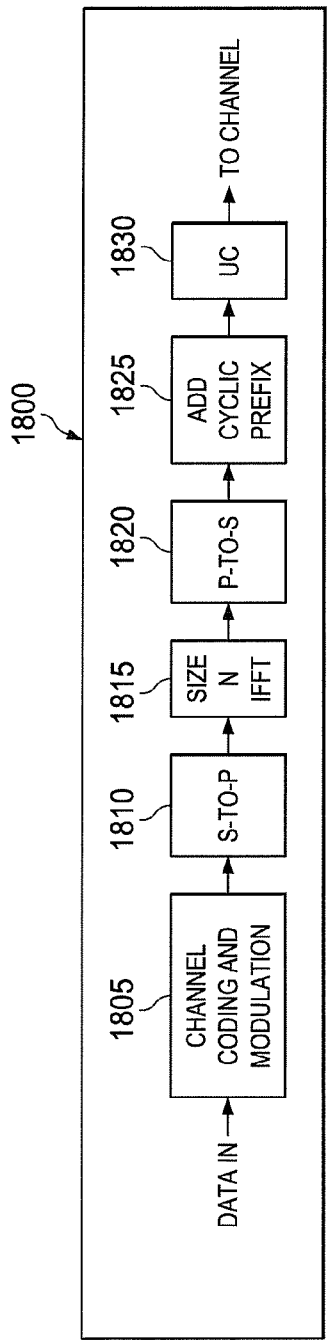
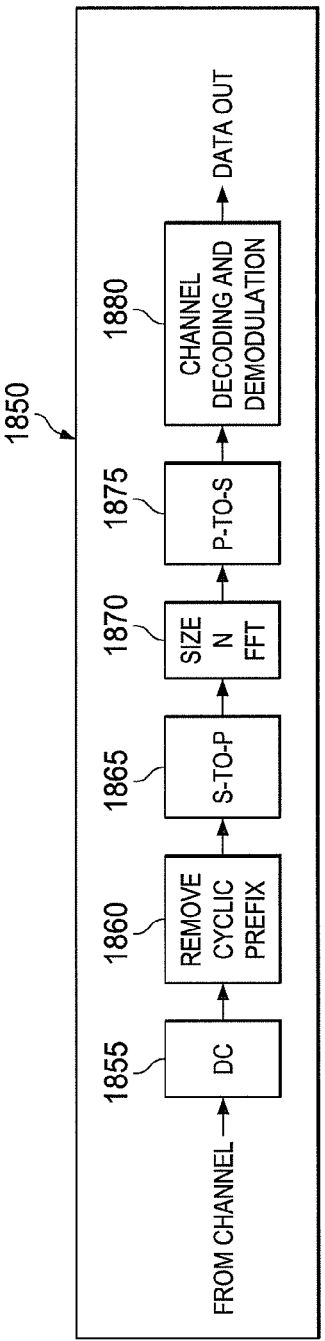
FIG. 18A
FIG. 18B

MULTI-USER AND SINGLE USER MIMO FOR COMMUNICATION SYSTEMS USING HYBRID BEAM FORMING

CROSS-REFERENCE TO RELATED APPLICATION(S) AND CLAIM OF PRIORITY

The present application claims priority to U.S. Provisional Patent Application Ser. No. 61/683,024, filed Aug. 14, 2012, entitled "MULTI-USER MIMO FOR COMMUNICATION SYSTEMS USING HYBRID BEAM FORMING". The content of the above-identified patent document is incorporated herein by reference.

TECHNICAL FIELD

The present application relates generally to wireless networks and, more specifically, to multiple user—multiple input multiple output (MU-MIMO) and single user—multiple input multiple output (SU-MIMO) wireless networks.

BACKGROUND

The technique of MIMO transmission (or spatially multiplexing) is a technique for increasing the spectral efficiency of a communication link, by enabling multiple streams to be sent at the same time and frequency. MIMO transmission can be categorized into two different techniques: single user MIMO (SU-MIMO) and multi-user (MU-MIMO). SU-MIMO supports only one user and can only maintain one communication link at one time. MU-MIMO however can support multiple users and therefore can support several links at the same time.

There are potential capacity benefits for MU-MIMO in any system in which one communication entity communicates with more than one other communication entity at the same time. Examples of such systems include cellular mobile communications and indoor WLAN (wireless local area networks) systems. Presently MU-MIMO is used in a number of different communication systems in conjunction with digital beam forming. Examples of such systems are IEEE 802.11ac [1] and the LTE standard. (Extensive support for which is provided from release 10 [2] onwards.)

SUMMARY

In some embodiments, a station in a wireless communication system can include a processor circuitry configured to form at least a first plurality of data streams and a second plurality of data streams, and a digital precoder configured to receive the first plurality of data streams and the second plurality of data streams. The wireless station can further include a plurality of radio frequency (RF) beamforming chains connected to the digital precoder and configured to form at least one RF envelope, wherein the digital precoder is configured to steer a plurality of digital beams within the at least one RF beam envelope, the digital beams forming a plurality of spatially distinct paths for the first plurality of data streams and a plurality of spatially distinct paths for the second plurality of data streams, and a plurality of antennas operably connected to the RF beamforming chains.

A method for use in a wireless network comprises transmitting from a first station a channel state information reference signal (CSI-RS) from a multiple user—multiple input multiple output (MIMO) multiplexing device through a plurality of baseband precoders for each of a plurality of radiofrequency (RF) precoders, receiving from a second station channel state information (CSI) for each of the baseband precoders and each of the RF precoders, calculating an optimal baseband precoder and RF precoder combination for a second station, transmitting an indication of the optimal baseband precoder and RF precoder combination to the second station, and transmitting a MIMO data stream to a second station using the selected baseband precoder and RF precoder combination.

A method for use in a wireless network comprises transmitting from a first station a channel state information reference signal (CSI-RS) from a multiple user—multiple input multiple output (MIMO) multiplexing device for a plurality of radiofrequency (RF) precoders, receiving feedback from a second station comprising an indication of a best precoding matrix indicator, transmitting an indication of a selected baseband precoder and RF precoder combination to the second station, and transmitting a MIMO data stream to a second station using the selected baseband precoder and RF precoder combination.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18A illustrates a high-level diagram of a wireless transmit path according to an embodiment of this disclosure;

FIG. 18B illustrates a high-level diagram of a wireless receive path according to an embodiment of this disclosure.

DETAILED DESCRIPTION

Figure 1:
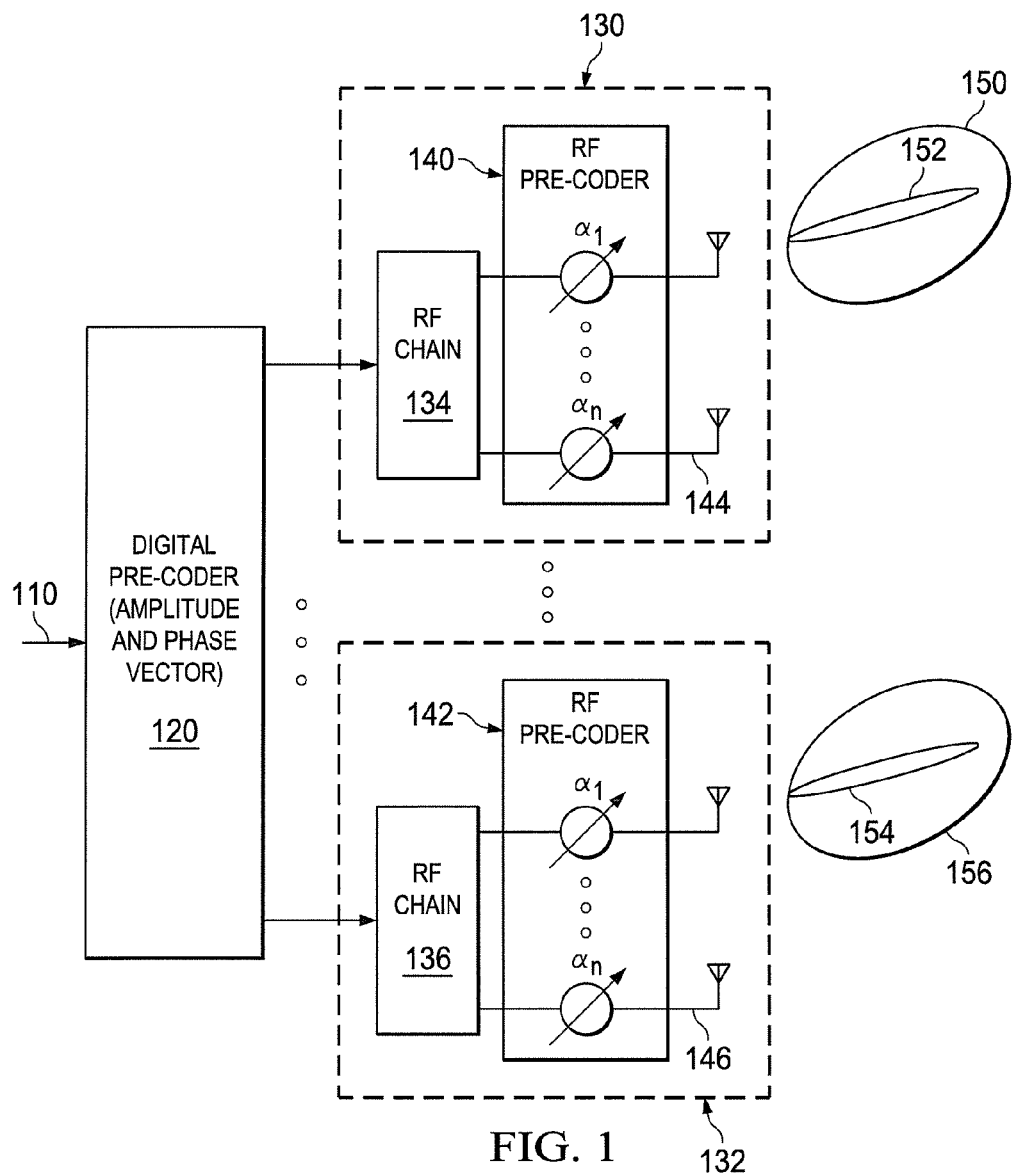
FIG. 1 illustrates a transmitter using hybrid beam forming according to an exemplary embodiment of the disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless station.

In wireless transmission systems, digital beam forming can provide advantages relating to flexibility. RF beam forming can provide advantages of low cost and low power consumption. Hybrid beam forming combines digital beam forming with RF beam forming. For some communications systems which require high gain antennas, hybrid beam forming can have advantages. One such example is a communication system which is operating at millimeter wave frequencies.

Hybrid beam forming also has constraints which severely complicate its use in many communication systems. However, these constraints can be overcome to enable the use of MU-MIMO/SU-MIMO transmission with hybrid beam forming. Signaling procedures can be devised to facilitate SU-MIMO/MU-MIMO transmission in conjunction with hybrid beam forming. Furthermore, user specific reference signals can be used to enable each user to perform channel estimation on each of the associated MIMO streams.

Beam forming can be used in different communication systems to improve the signal to noise ratio (SNR) and/or signal to interference +noise ratio (SINR) or a given communication link. There can be many different ways to implement beam forming, but they can be broadly characterized into three different types: RF (or analog) beam forming, digital beam forming, and hybrid beam forming which utilizes both RF and digital beam forming to form a beam.

RF (or analog) beam forming uses RF (or analog) phase shifters to phase shift the received (or transmitted) signals from the receiving (or to transmitting) antenna elements of the antenna array. For receiver beam forming the output of the different phase shifters can be combined and fed to the receiver. For transmitter beam forming the output of the transmitter can be passed to the phase shifters before being fed to the antennas. A specific angular response (or radiation pattern) for the antenna array can be set by setting the phase shifters and by changing the phase shifters the angular response (or radiation pattern) can then be steered.

One of the key advantages of RF beam forming is that since the beam is formed at RF frequencies, only one receiver or (transmitter chain) is needed to perform beam forming. However RF phase shifters traditionally have limited bandwidth and all signals for the single receiver (or transmitter) are constrained to use the selected RF beam.

In contrast to RF beam forming, digital beam forming is performed at baseband and therefore normally multiple receiver chains are needed for digital receiver beam forming. Traditionally one receiver chain is used for each antenna element and therefore for an example 8 element array, 8 receiver chains would be needed.

Digital beam forming has advantages over RF beam forming. Increased flexibility: Since beam forming is performed at baseband, different frequency components of the received (or transmitted signal) can be assigned different phase shifts. This is especially useful for multi-carrier (i.e. OFDM) systems where different carriers may require the beam to be pointed in different directions. Increased speed: changing the digital phase weight is typically faster than changing the phases of an analog or RF phase shifter.

Digital beam forming however has a number of disadvantages over RF beam forming. The signal bandwidth is restricted by the Analog to Digital converter (ADC) in the receiver. Using digital beam forming with very wideband signals therefore requires very high speed ADCs which are expensive and consume a lot of power. Complexity, cost and power consumption of digital beam forming are much higher than RF beam forming since multiple transceiver chains are needed for digital beam forming.

Wide band communication systems at very high frequency application (i.e. 60 GHz and above) can use RF beam forming instead of digital beam forming since for RF phase shifting the limiting bandwidth is the fractional bandwidth (=bandwidth/center frequency) and for digital beam forming the limiting bandwidth is the real bandwidth. A typical 60 GHz communication system may have a bandwidth of more than 1 GHz, but the fractional bandwidth is only 1.6%. High sampling rate ADCs (in the case >1 GHz) are very expensive and have a high power consumption.

When the communication bandwidth is not too large, RF beam forming and digital beam forming may be combined, which is often called hybrid beam forming. There are different types of hybrid beam forming.

FIG. 1 illustrates an example of a transmitter using hybrid beam forming. A processing circuitry passes a data stream 110 to a digital precoder 120. The digital precoder 110 digitally phase shifts (and optionally digitally amplitude weights) the signals 110 which are passed to different RF chains which contain different banks of RF phase shifters 130, 132. While two phase shifters per bank 130 and 132 are shown, any finite number n of phase shifters n may be employed per bank. The RF envelope circuitry 130 can include an RF chain 134, RF precoder 140, and antennas 144. The RF envelope circuitry 132 can include an RF chain 136, RF precoder 142, and antennas 146. RF envelope circuitry 130 produces RF phase shift envelope 150, and RF envelope circuitry 132 produces RF phase shift envelope 156. The RF phase shift envelopes 150 and 156 are RF radiation patterns which can occur in the absence of the further narrowing influence of digital precoder 110. The terms RF beam pattern and RF beam envelope may be used interchangeably herein.

In this way the RF beam patterns 150, 156 formed by the different RF phase shifter sets 130, 132 are phase combined with each other depending upon the digital precoder 120. (In general, this may refer to the vector of phase shifts (and amplitude weights) of the digital section as the digital pre-coding vector and the vector of the RF phase shifts as the RF pre-coding vector.) This digital phase combining of the RF beams results in new composite radiation patterns 152, 154. Any combination of digital pre-coding and RF pre-coding can be used to make an arbitrary radiation pattern.

However, when the separate RF beam patterns 150, 156 formed by the RF pre-coders 140, 142 are in the same direction, the digital pre-coder can therefore be used to create a finer beam 154, 156 which can be steered within the RF beam.

In this way, very fine beams 152, 154 can be created and digitally steered with both the RF phase shifters 130, 132 (pre-coder) and the digital phase shifters (pre-coder) contributing. Compared to straight RF beam forming therefore, flexibility can be improved since different frequency components of the signal can be steered in different directions. Additionally, compared to digital beam forming the cost can be reduced, as not as many parallel receiver or transmitting chains are needed to support a given antenna gain, since both the RF beam forming and the digital beam forming act together to provide the total antenna gain.

A substantial constraint with hybrid beam forming, however, is that, the composite beam can only formed within the constraints of the formed RF beam. This constraint issue is complicated when using MU-MIMO or SU-MIMO with hybrid beam forming.

Due to the restrictions that hybrid beam forming has, it is important that the different streams needed for SU-MIMO or MU-MIMO are correctly mapped to the corresponding RF chains and that the digital pre-coder is correctly set up on the transmitting device to support one link (for SU-MIMO) or multiple co-scheduled links (MU-MIMO). This device may be called the 'Transmitting MIMO device'. This device would typically be a base station or access point, but may also be a user end terminal or mobile device. It can also be generically referred to as a "station".

In various embodiments, alternative approaches may be employed for mapping the required streams for MU-MIMO to the hardware resources on the multiplexing MU-MIMO device.

Figure 2:
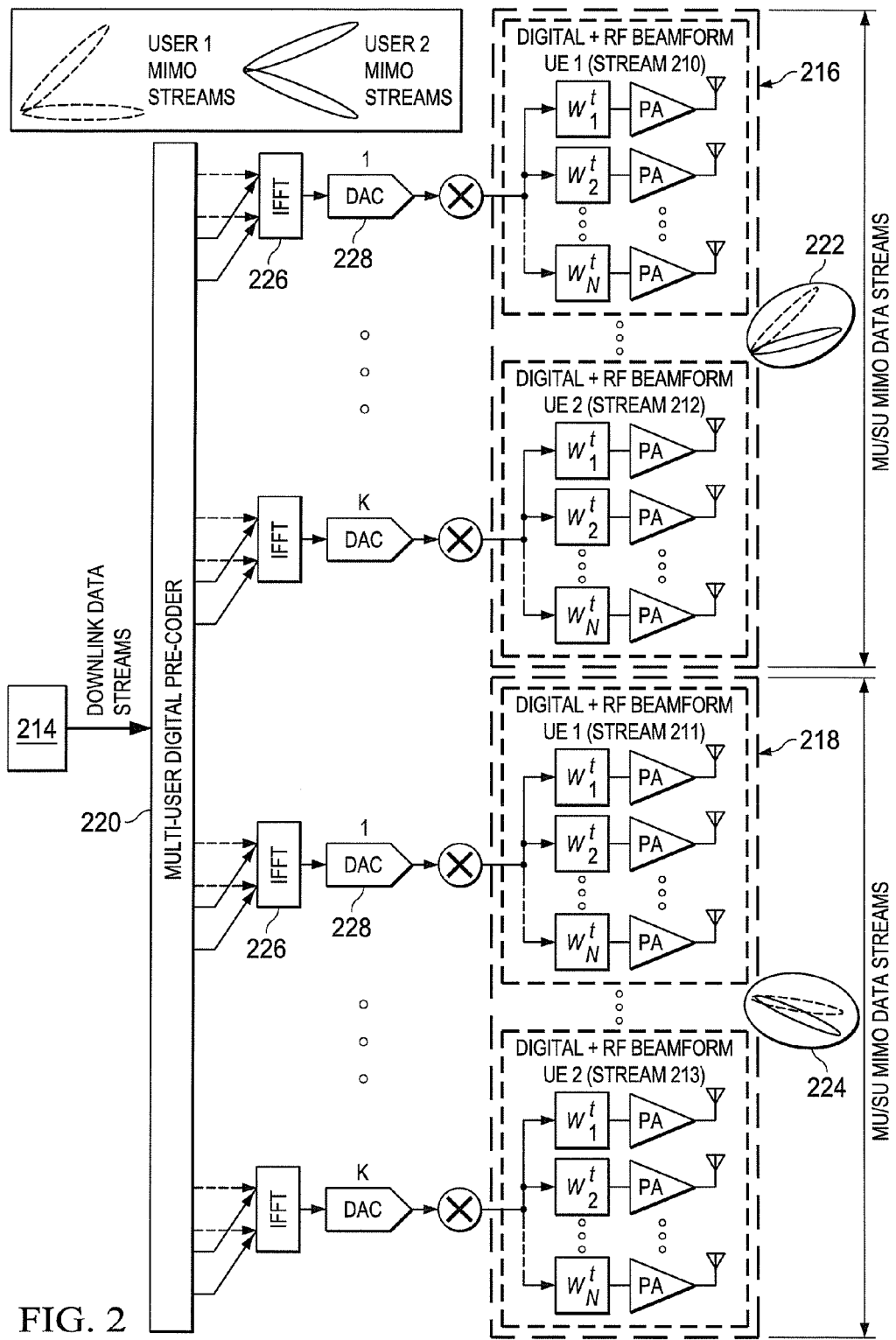
FIG. 2 illustrates a wireless station where the MIMO data streams are mapped to different RF envelopes according to an exemplary embodiment of the disclosure.
Figure 3:
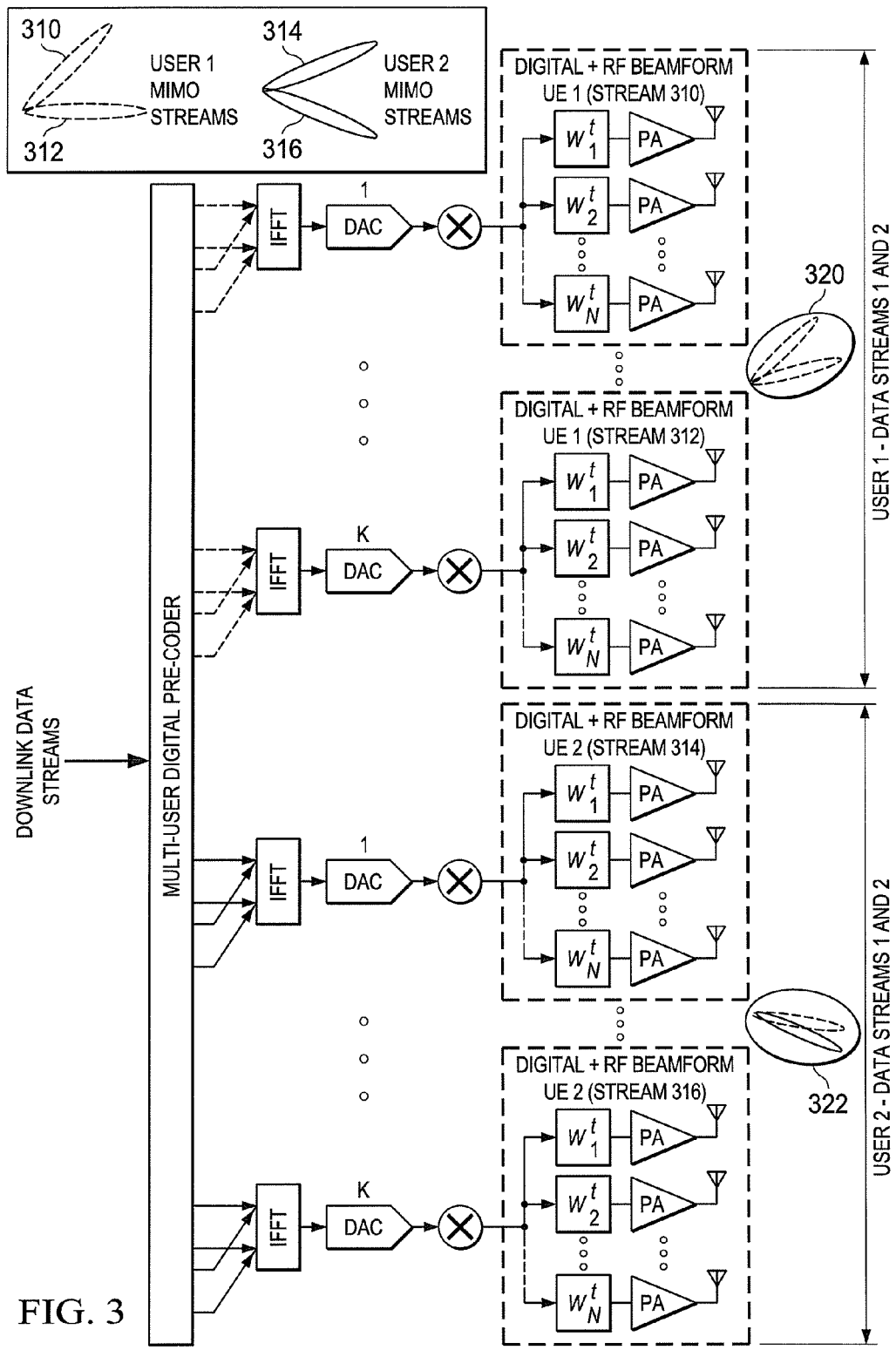
FIG. 3 illustrates an alternative MIMO mapping configuration according to an exemplary embodiment of the disclosure.
Figure 4:
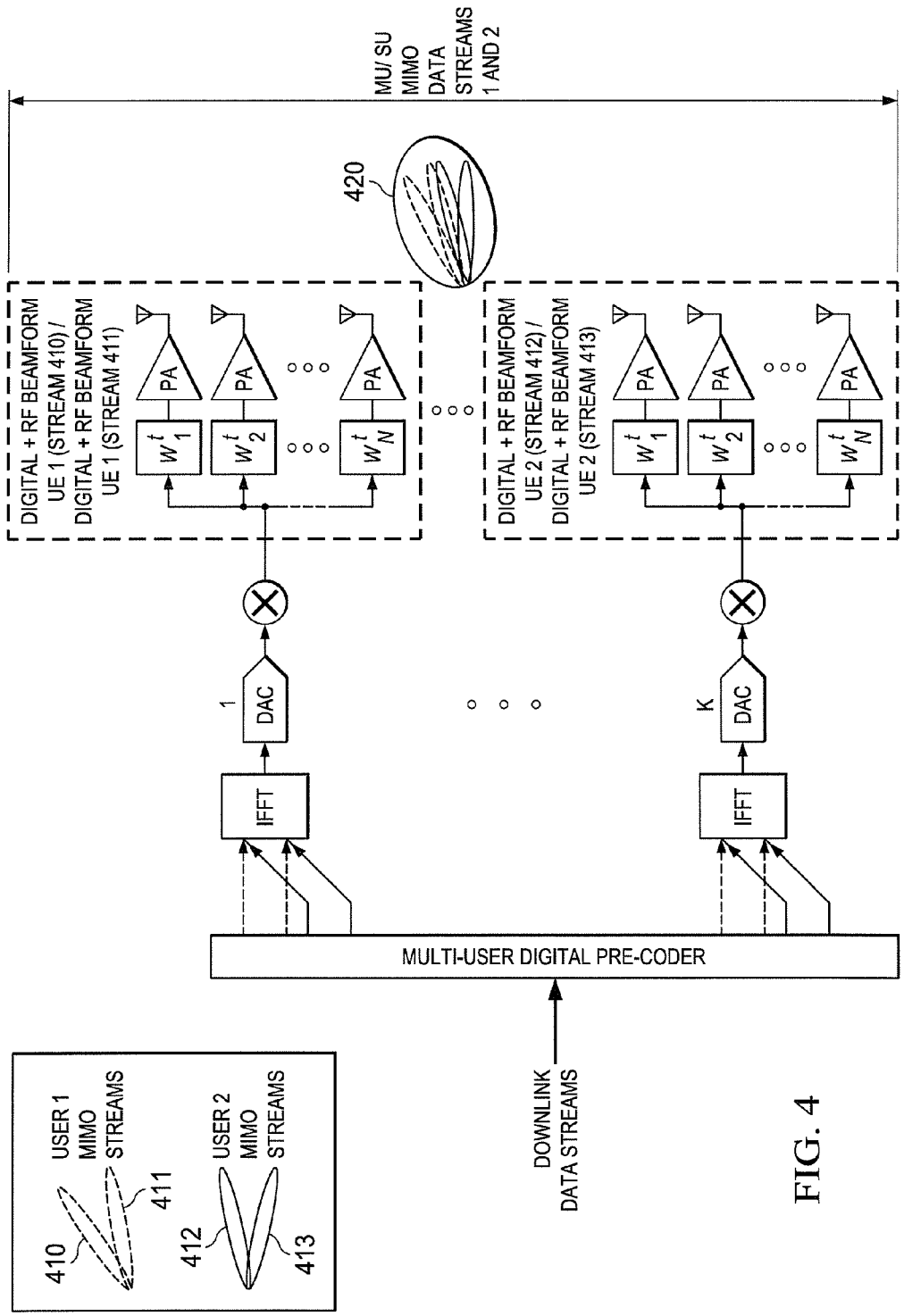
FIG. 4 illustrates another alternative MIMO mapping configuration according to an exemplary embodiment of the disclosure.

Several different examples of different mappings of MU-MIMO streams (or multiple SU-MIMO streams) to RF chains are shown in FIGS. 2-4. It is important to note that multiple SU-MIMO streams may be defined as multiple links which are scheduled at the same time, but are allocated different frequencies (or sub-carriers). Further, it is important to note that, although two paths are shown as being mapped to a user, this is done for the sake of a simplified illustration, and the disclosure is not so limited. It is contemplated that more than two paths may be used for a single user in a MIMO system.

Figure 5:
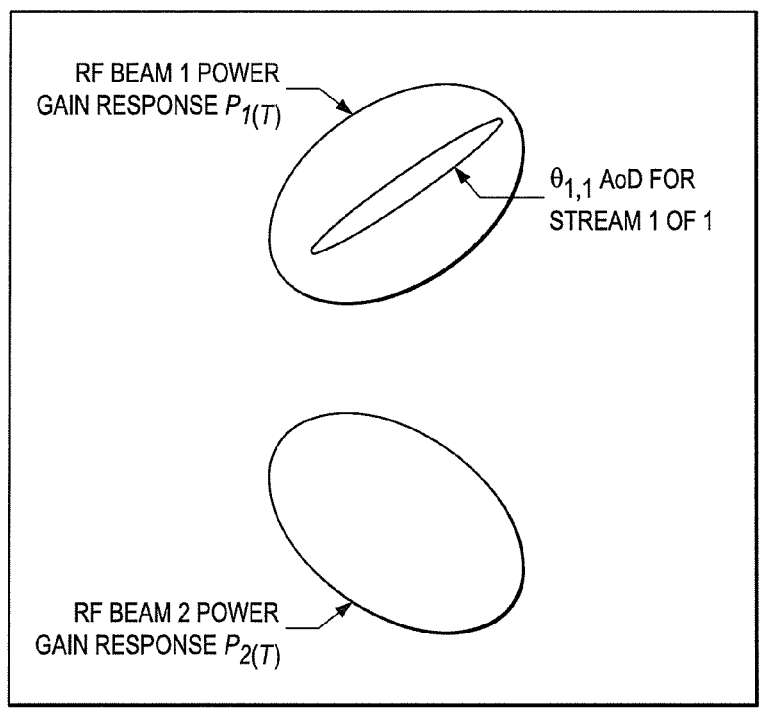
FIG. 5 is a flow diagram illustrating a method of determining an Angle of Departure according to an exemplary embodiment of the disclosure.

Embodiments of different mappings of MU-MIMO streams to RF chains are shown in FIGS. 3-5. The examples are for an OFDM system (hence an IFFT is shown in the transmission path), but any modulation scheme can be used. For all figures the required directions for the different MIMO streams are shown in the upper left of the figure and the large oval shape next to the different RF sections show the example beam shape which, is formed just due to RF beam forming. Again, this may be called an RF pattern or RF envelope. Inside the oval shapes are the example beam shapes which are formed from both RF and digital beam forming.

FIG. 2 illustrates a wireless station where the MIMO streams 210, 211 for user 1 and the MIMO streams 212, 213 for user 2 are mapped to different RF chains 216, 218 and each. RF chain transports two streams, one for each user. Thus, user 1 MIMO stream 210 is mapped to RF envelope 222, and User 1 MIMO stream 211 is mapped to RF envelope 224. User 2 MIMO stream 112 is mapped to RF envelope 222, and User 2 MIMO stream 213 is mapped to RF envelope 224.

FIG. 2 illustrates a top set of RF chains 216 which transports streams 210 for User 1 and 212 for User 2, and a bottom set of RF chains which transports streams 211 for User 1 and 213 for User 2. A processing circuitry 214 can form a plurality of downlink data streams, in addition to other transmission and reception functions.

FIG. 2 illustrates an OFDM system including an IFFT 226 and DAC 228 connected between the digital precoder 220 and each RF chain 216, 218. While 2K chains are illustrated, any number of RF chains may be provided, as indicated by dashed lines between repeating groups of circuits.

FIG. 3 illustrates a case when the different MU-MIMO streams are sufficiently angularly close so that they can be mapped to one RF chain. Here, user 1 MIMO stream 310 is mapped to RF beamform 320, and user 1 MIMO stream 312 is also mapped to RF beamform 320. User 2 MIMO stream 314 is mapped to RF beamform 322, and user 1 MIMO stream 316 is mapped to RF beamform 326.

FIG. 4 illustrates mapping of data streams to RF beam forming chains at MU-MIMO multiplexing device, where each user's MIMO streams are transmitted inside one RF beam. Here, user 1 MIMO stream 410 and 411 is mapped to RF beamform 420, and user 2 MIMO stream 412 and 413 is also mapped to RF beamform 420.

In various embodiments, a solution for hybrid beam forming can be found when the RF beam forming is code book based (which means there is a finite set of steering directions) and is combined with the digital beam-forming.

In some embodiments, the digital beam forming is code book based. This means that the digital beam forming (from the digital pre-coder 220) which feeds the different RF antenna arrays (See FIG. 2) has a finite number of steering directions. This would be used in conjunction with the RF beam-forming for codebook based (RF and digital) SU-MIMO or for codebook based (RF and digital) based MU-MIMO. This disclosure addresses how to select the RF beams and the digital beams from their respective codebooks.

In some embodiments, digital beam forming can be non-codebook based. This means that the digital beam forming (from the digital pre-coder 220) which feeds the different RF antenna arrays 216, 218 (see FIG. 2) does not have a finite number of steering directions. For MU-MIMO the weights for the digital beam-forming would be calculated using a MU-MIMO pre-coding algorithm. This case can be used in conjunction with RF beam-forming for codebook based RF and non-code book MU-MIMO. In this case, the disclosed embodiments illustrate how to select the RF beams from the RF code book.

The required streams for MU-MIMO or SU-MIMO can be mapped to the hardware resources on the MIMO transmitter device in various alternative embodiments.

In some embodiments, available estimates of angle of departure (AoD) and/or angle of arrival (AoA) can be used. In some systems full channel estimates for the different required links from the transmitting MIMO device to and from the other communications devices may be available due to already available algorithms or channel estimation procedures.

In some embodiments, these available algorithms or procedures may form estimates for the angle of departure (AoD) and the power for each of the transmission paths needed to perform MIMO transmission from the MU-MIMO multiplexing device to the other communicating devices (forward direction) and/or estimates of the angle of the arrival (AoA) and signal power for each of the receiving paths from the communicating devices to the MIMO multiplexing device (reverse direction).

To illustrate the approach, a system may be considered with K users where $M_i$ significant AoDs have been identified from the MIMO multiplexing device to user i (where $1 \le i \le K$) and these are denoted as $\theta_{i,1}, \theta_{i,2}, \ldots \theta_{i,M_i}$. (It is important to note that the criterion of being significant is based on the estimated signal power for each AoD.) Additionally, $N_i$ significant AoAs may have been identified from user i to the MU-MIMO multiplexing device and these are denoted as $\Phi_{i,1}, \Phi_{i,2}, \ldots \Phi_{i,N_i}$.

To enable the $M_i$ streams to be sent from the MIMO multiplexing device and received at the $i^{th}$ MS, the relevant streams needs to be passed to a RF chain which is using the most suitable steering direction (from the code book). The most suitable RF chain would be the one in which the received or transmitted angular stream has the highest gain.

A simple way to define this mathematically is as follows: The MIMO transmitting device may be defined to have Q RF chains (Or Q RF code book directions) where a given chain j (or code book entry) has a power gain response $P_j(\gamma)$ for a given angle $\gamma$ and a corresponding half power beam width of $HPBW_j$, a simple rule can be derived as follows:

Chosen RF chain (or RF code book beam) for transmitted stream l of user i=

$$\arg\max_j (P_j(\theta_{i,l})) \quad (1)$$

Chosen RF chain (or RF code book beam) for received stream l of user i=

$$\arg\max_j (P_j(\phi_{i,l})) \quad (2)$$

FIG. 5 illustrates how the RF beam would be selected from the code book based on an AoD estimate.

In addition to selecting the most appropriate RF beams, if the AoDs (or AoAs) estimate were accurate enough, the AoD estimate could also be used to select the digital beams inside the RF beam from the digital code book.

For such high accuracy AoD schemes, both RF and digital beams could then be selected for the case of codebook based (RF and digital) SU-MIMO or codebook book based (RF and digital) MU-MIMO.

For the case of MU-MIMO with codebook based RF beam forming and non-code book based digital beam forming, the AoD estimates could select the RF beams, but the digital beams would have to be selected using MU-MIMO pre-coding algorithm. For this arrangement, however, the AoD knowledge can be used to assist the MIMO transmitter device to make multi-user scheduling decisions, based on the estimated AoDs of the different possible users that can be scheduled.

In still other embodiments, a reduced set channel sounding may be performed on RF beams only.

If estimates of the AoA and/or AoD are not available, an approach can be used when a number F of good RF beams have been identified for each user due to some already existing procedures. Examples of existing procedures which may have identified for transmission and/or reception include RF beams that were used for successful RACH reception at the MIMO serving device (i.e. base station) or uplink/downlink synchronization channel acquisition.

An additional possibility to identify a set of good RF beams for communications can be to perform first a full beam forming sweep (as described later in approach 4) which may have occurred at a previous period in time.

Figure 6:
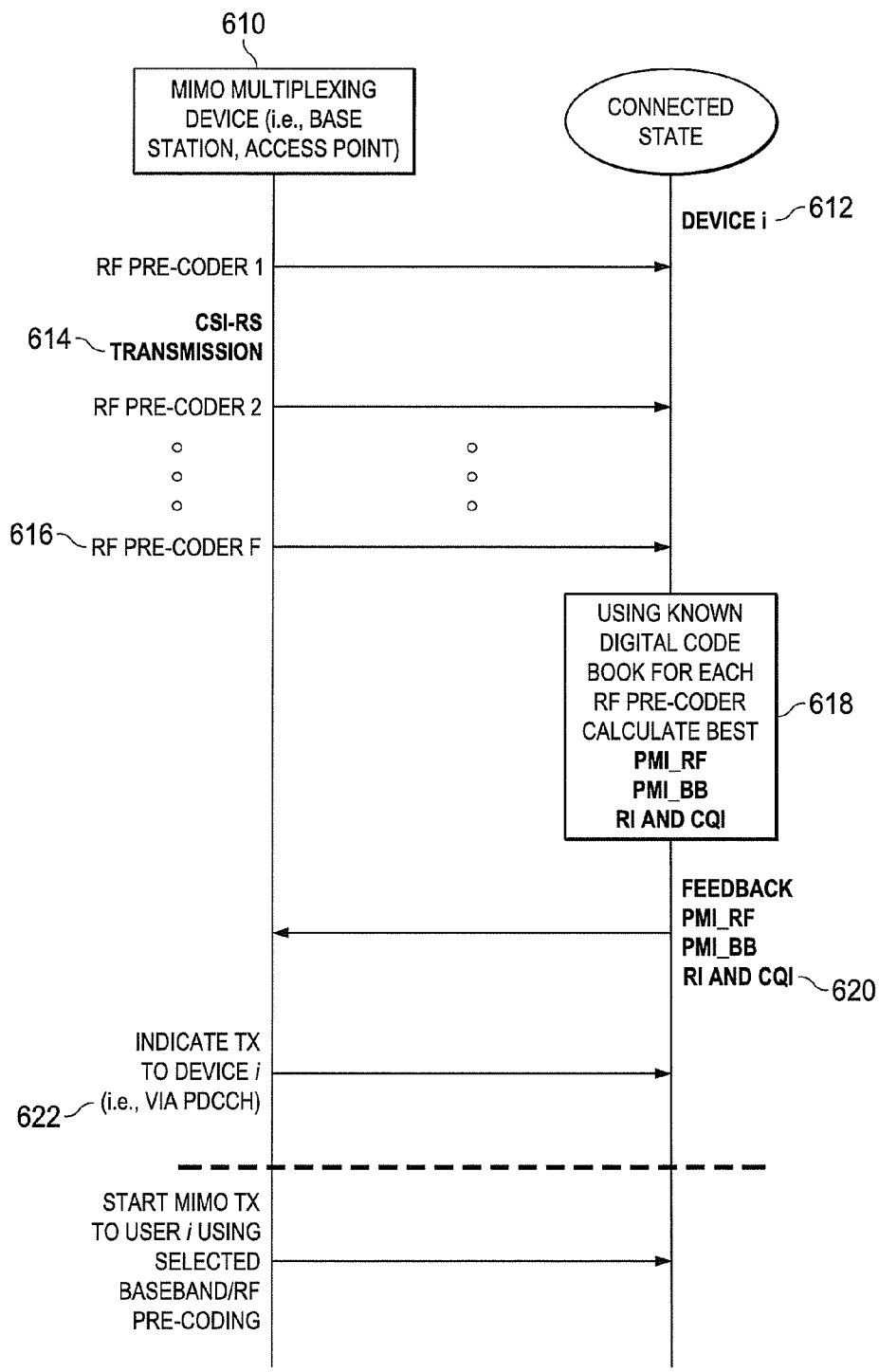
FIG. 6 is a flow diagram illustrating a code book method of a MIMO multiplexing device according to an exemplary embodiment of the disclosure.

FIG. 6 illustrates a code book based signaling procedure in accordance with embodiments. In these embodiments, the digital code books may be assumed to be stored at, the receiver for each of the RF beams in the RF codebook. To achieve selection of the best of RF beams and best digital beams, CSI-RS information 610 can be sent to each user i 612 on each of the identified F RF beam. This procedure needs to be performed for each user. There are several feedback possibilities, and Figure illustrates one possibility. For the feedback approach shown in FIG. 6, the receiver performs channel estimation for each of the identified RF beams used at the transmitter and for each of its receivers RF beams. Since the receiver also has knowledge of the digital code book for each of the RF beams 616 at both the transmitter and the receiver, the receiver then calculates at 618 the best combination of digital and RF pre-coders for different possible ranks and then feeds back at 620 to the transmitter the preferred RF pre-coder at the transmitter (as PMI_RF), the preferred digital pre-coder at the transmitter (as PMI_BB), the selected rank (as RI) and the respective channel quality information (as CQI).

The values of PMI_BB, CQI and RI may be fed back as wide band values (one for all sub-carriers) or on a sub-band basis (one value for a group of carriers). There feedback process for PMI_BB, PMI_RF, CQI and RI may also be periodic or aperiodic.

It is important to note that FIG. 6 only illustrates one feedback possibility. Alternative feedback schemes can also be used.

Feedback at 620 of a preferred RF digital pre-coder (PMI_RF), channel state information (CSI) for the PMI RF and the Rank Information (RI) based on PMI_RF. The MIMO serving device then chooses PMI BB based on feedback CSI for PMI RF at 622.

Figure 7:
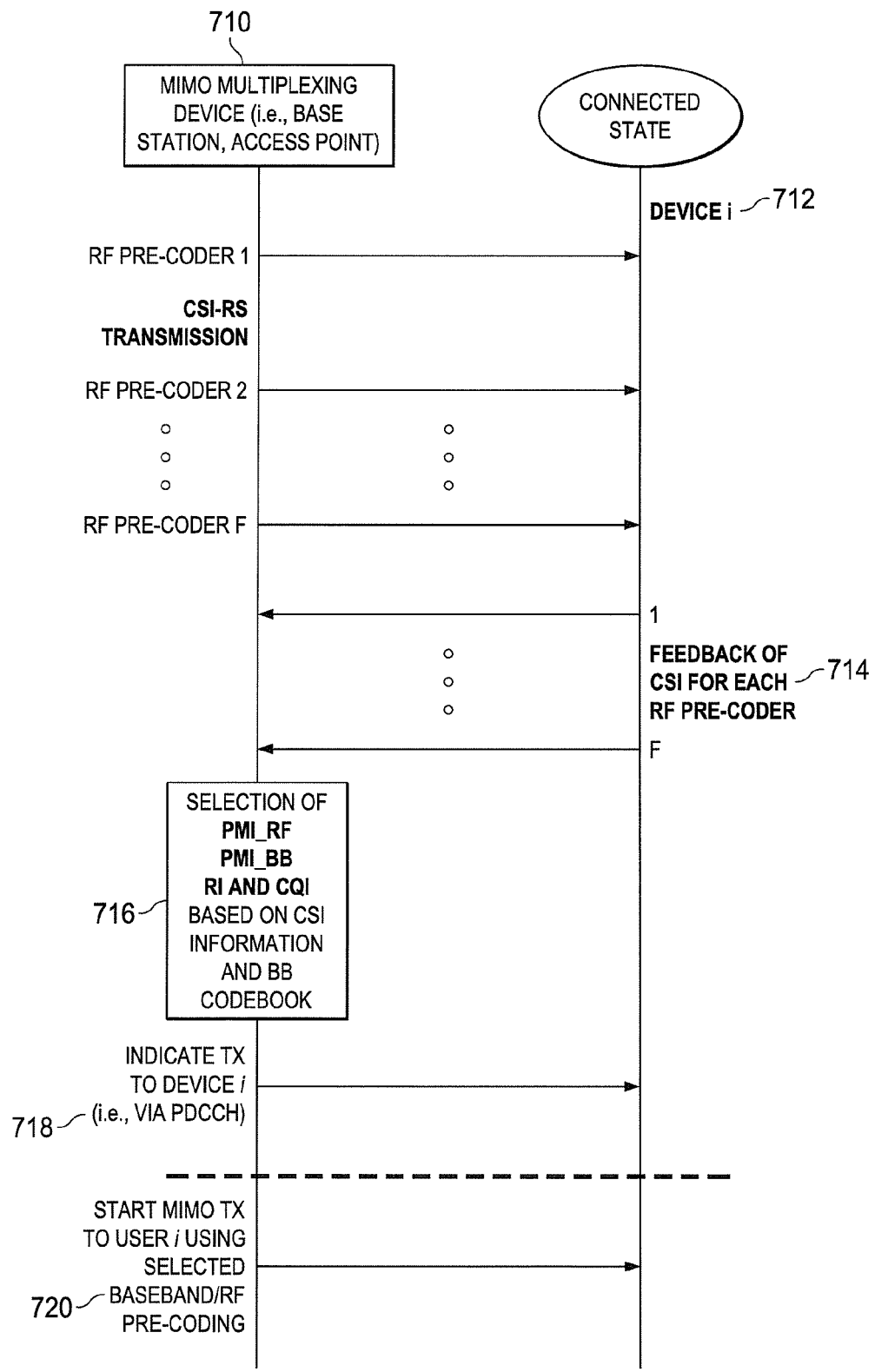
FIG. 7 is a flow diagram illustrating an alternative code book method of a MIMO multiplexing device according to an exemplary embodiment of the disclosure.

FIG. 7 illustrates an alternative feedback configuration according to embodiments. Feedback at 714 of channel state information (CSI) for each of F RF pre-coders. The MIMO serving device (transmitting device) than chooses PMI RF, PMI_BB and Rank at 716. (In this scheme it is not required that the receiver device knows the digital code books used at the transmitter.) Other feedback methods may also be possible.

For the receiver to calculate the PMI_RF, PMI_BB, CQI and RI, it is important to understand the equation for the received signal for the hybrid beam-formed system. To illustrate, consider the hybrid schemes shown in FIG. 2, FIG. 3 and FIG. 4, and a component of an arrangement is illustrated in FIG. 8.

Figure 8:
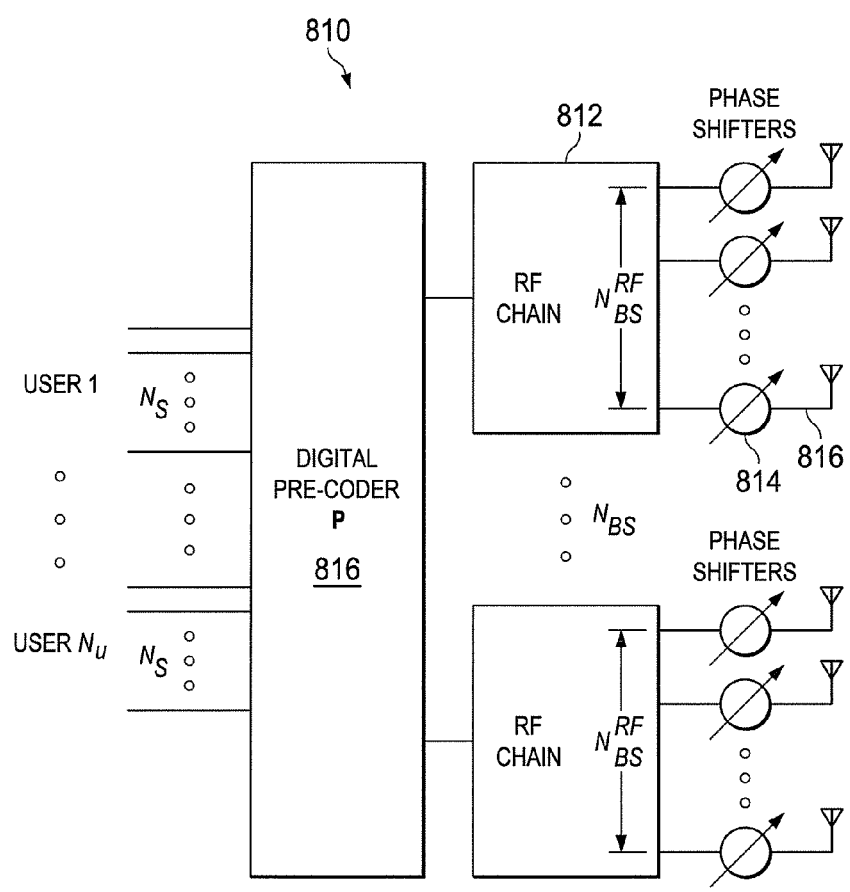
FIG. 8 illustrates a component of a MIMO device according to an exemplary embodiment of the disclosure.

Referring to FIG. 8, to build the mathematical framework, the receiver may be assumed to also use a hybrid beam type system which uses both RF and digital beam-forming. The transmitting devicce 810 (or base-station (BS)) has $N_{as}$ RF chains 812, where each RF chain has phase shifters 814 (each connected to one antenna element 816) and it may be assumed that the receiver or (or mobile station (MS) has $N_{MS}$ RF chains and each chains has $N_{MS}^{RF}$ phase shifters. The signal (before receiver combing or digital beam forming) at the $n^{th}$ receiver is therefore given by:

$$y_n = V_n^H H_n T + V_n^h n, \quad (3)$$

where $V_n$ is the overall RF pre-coder matrix at the receiver (or mobile station (MS)) containing all of the $N_{MS}$ receiver RF chains pre-coding vectors $v(\delta_i)$ pointing to direction $\delta_i$, $$V_n = \begin{bmatrix} v(\delta_1) & 0 & \cdots & 0 \\ 0 & v(\delta_2) & \cdots & 0 \\ 0 & 0 & \ddots & \vdots \\ 0 & 0 & \cdots & v(\delta_{N_{MS}}) \end{bmatrix} \quad (4)$$

$H_n$ is the overall $N_{MS} N_{MS}^{RF} \times N_{RS} N_{BS}^{RF}$ channel matrix from all the transmitting antennas to all of the receiving antennas for user n, n is the additive white complex Gaussian noise vector and T is the total transmitter matrix which is sent on the total of the $N_{BS}^{RF} N_{BS}$ transmitting device antennas. The transmitter matrix is turned T is defined as, $$T = WPs, \quad (5)$$

where W is the overall RF pre-coder matrix at the transmitter containing all of the $N_{BS}$ pre-coder vectors $w(\theta_i)$ pointing to do direction $\theta_i$, $$W = \begin{bmatrix} w(\theta_1) & 0 & \cdots & 0 \\ 0 & w(\theta_2) & \cdots & \vdots \\ \vdots & \vdots & \ddots & \vdots \\ 0 & 0 & \cdots & w(\theta_{N_{BS}}) \end{bmatrix} \quad (6)$$

and P 816 is the overall digital pre-coder at the transmitter and s is the vector of the all of the transmitted streams data streams.

For each receiving device 612 (in FIG. 6) to calculate the best RF pre-coder (PMI_RF) and the best digital pre-coder (PMI_BB) at the base station with the respective CQI and RI, the base station needs to evaluate for each received signal from each of the used transmitted RF pre-coders in FIG. 6, the best effective channel when different digital pre-coders are used from the known digital code book. For each of these evaluations the receiver also needs to find the best RF and digital pre-coder at the receiver.

Irrespective of the feedback method used the MIMO transmitting device (or BS) will make the final decision for the final selected digital and RF pre-coder. This may be different to the one requested by the receiving device.

Once the decision has been made by the MIMO multiplexing device, the MIMO multiplexing device signals at 718 (or 622) to each of users via a downlink control channel (i.e. via DPCCH) the selected RF and baseband pre-coder and the rank that will be used for final transmission. At 720, the MIMO multiplexing device starts the MIMO transmission using the selected baseband and RF pre-coding.

An alternative to signaling the chosen RF and digital code books to the receiver is the use of user specific channel sounding pilots (or user specific reference signals (UE-RS)) which will be also be transmitted using the same selected RF and baseband pre-coders which are used for the data transmission. In this way, the receiving device can obtain channel estimates for each of the chosen RF and digital pre-coders selected for transmission.

Figure 9:
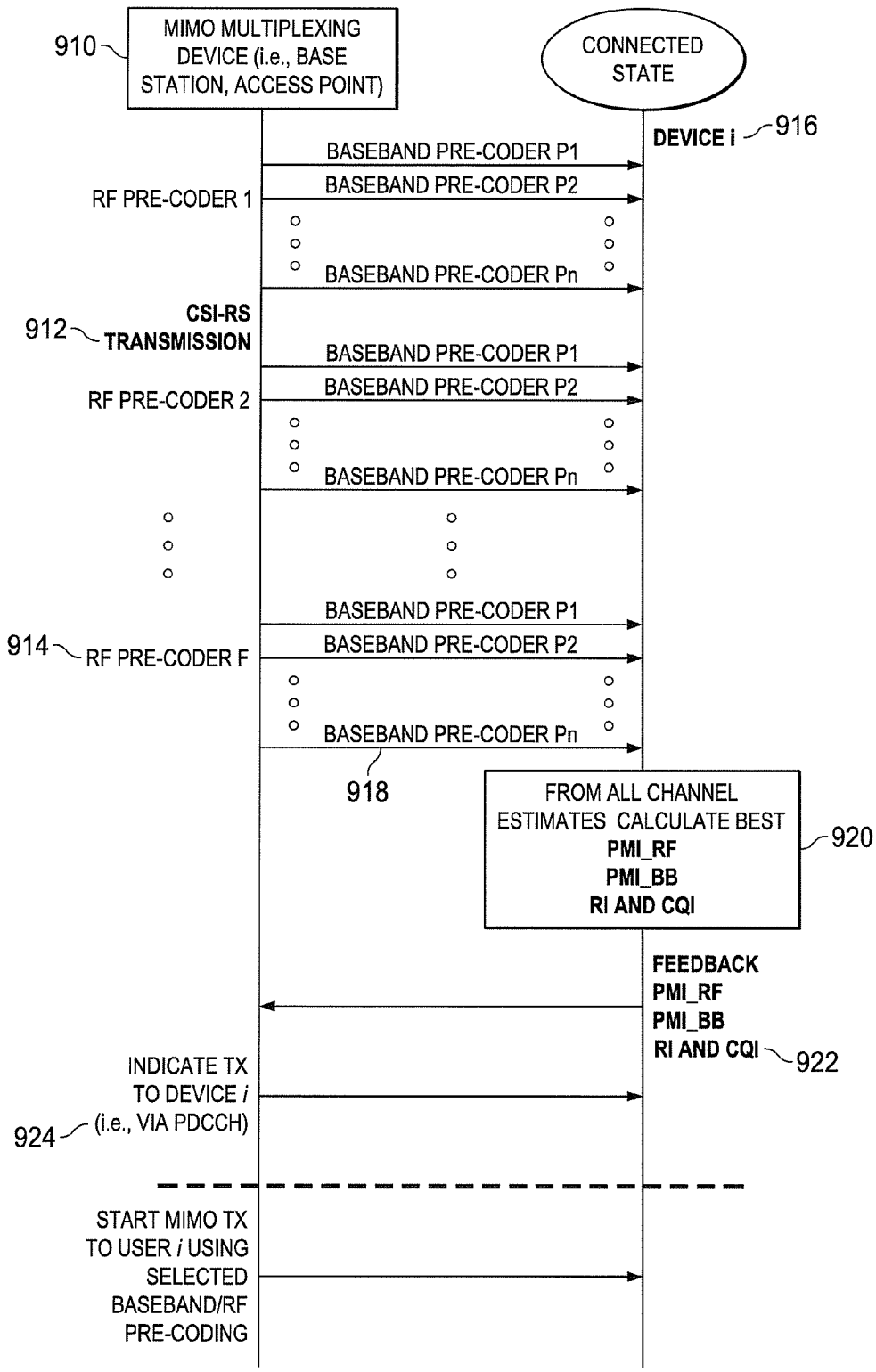
FIG. 9 is a flow diagram illustrating an non-code book method of a MIMO multiplexing device according to an exemplary embodiment of the disclosure.

FIG. 9 illustrates signaling a reduced set channel sounding for RF and digital beams. In the same way as described in previous embodiments, F good slices (or F RF beams) can be identified from the transmitter.

However, in embodiments such as that shown in FIG. 9, the digital code books may be assumed not to be stored at the receiving device 916 for each of the identified F RF beams. To achieve selection of the best digital 918 and RF pre-coders 914, the MIMO multiplexing device 910 transmits CSI-RS pilots 912 on each of the digital beams inside each of the RF beams 914, using the entries in the digital code book. (This procedure needs to be performed for each user i). In this way, the best digital 918 and RF pre-coders 914 can be found for each of the required streams for each of the users which are to be supported.

For the feedback approach shown in FIG. 9, the receiver 916 performs channel estimation at 920 for each combination of RF and digital beams used at the transmitter 910 and for each of its receivers of RF beams. The receiver 916 then calculates the best combination of digital and RF pre-coders for different possible ranks at 920 and then feedbacks to the transmitter the preferred RF pre-coder at the transmitter (as PMI RF), the preferred digital pre-coder at the transmitter (as PMI_BB), the selected rank (as RI) and the respective channel quality information (as CQI) at 922.

Figure 10:
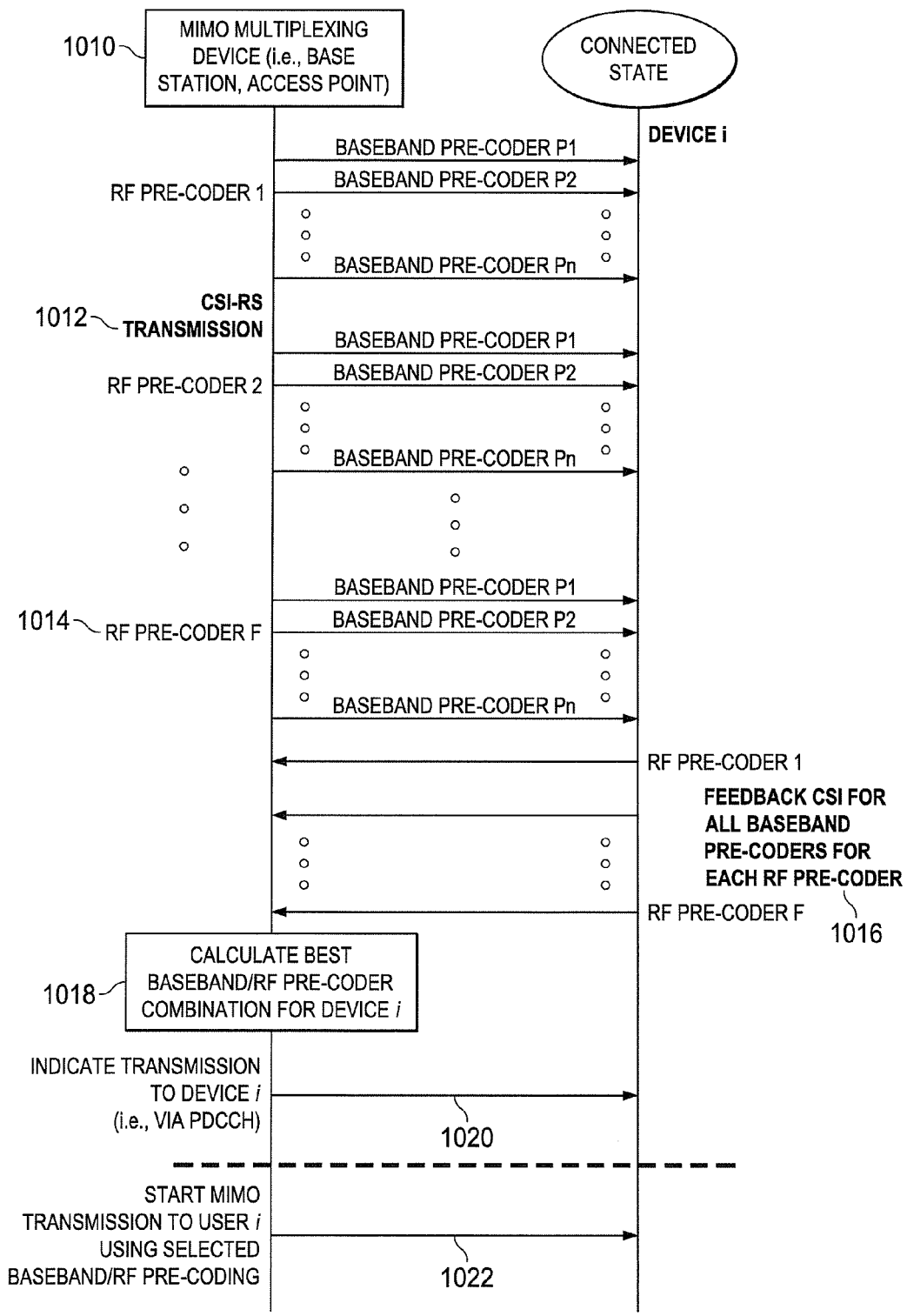
FIG. 10 is a flow diagram illustrating an alternative non-code book method of a MIMO multiplexing device according to an exemplary embodiment of the disclosure.

FIG. 9 illustrates one feedback possibility. As illustrated in FIG. 10, an alternative feedback scheme would be to feedback the channel state information at 1016 for each of the RF 1014 and digital pre-coder combination. Other feedback schemes may also be possible.

Irrespective of the feedback scheme, the MIMO transmitting device will make the final decision for the final selected digital and RF pre-coder. This may be different to the one requested by the receiving device.

Once the decision has been made by the MIMO multiplexing device, the MIMO multiplexing device signals at 1020 (or 922) to each of users via a downlink control channel (i.e. via DPCCH) the selected RF and baseband pre-coder and the Rank that will be used for final transmission 1022.

An alternative to signaling the chosen RF and digital code books to the receiver is the use of user specific channel sounding pilots (or user specific reference signals (UE-RS)) which will be also be transmitted using the same selected RF and baseband pre-coders which are used for the data transmission. In this way, the receiving device can obtain channel estimates for each of the chosen RF and digital pre-coders selected for transmission. In this way the channel sounding time is drastically reduced for multiple users.

Figure 11:
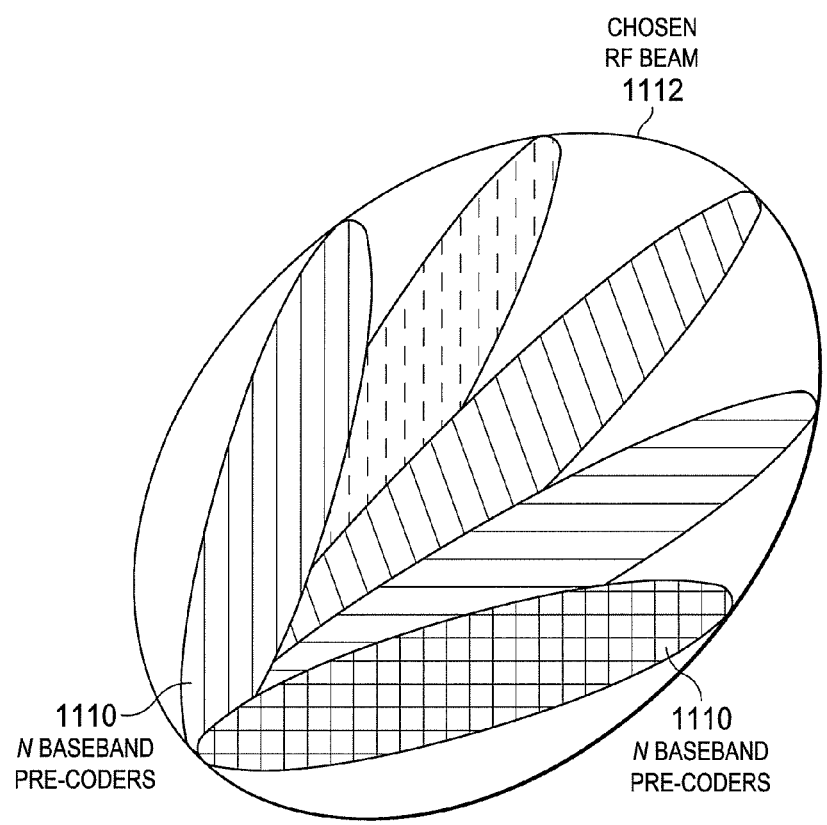
FIG. 11 illustrates an hybrid beam pattern in a MU-MIMO multiplexing device according to an exemplary embodiment of the disclosure.

If the procedures shown in FIG. 9 and FIG. 10 are used and the different digital pre-coders are sounded in series (or staggered in time) the sounding procedure could be excessively time consuming. Therefore, the different digital pre-coders shown in FIG. 7 can use different orthogonal spreading codes (in time/frequency or both) so that the different digital pre-coders can be used at the same time without interfering with each other and the time needed for sounding could then be reduced. FIG. 11 illustrates different digital pre-coders using different spreading sequences (different digital (or baseband) pre-coders 1110 using different sequences in time or frequency within a chosen RF beam 1112. For the channel estimates to be performed at the receiver, the receiver would then need to know the completed set of orthogonal spreading codes that could be used.

If the entire procedures shown in FIG. 6 to FIG. 10 have to be repeated for every user one at time the channel sounding procedure would be very time consuming. Therefore the base station (or MIMO multiplexing device) can perform signaling to multiple users at the same time which have a common set of identified RF beams.

To illustrate with an example, if the system had users, the first user had identified $K_1$ good RF beams and the second users had identified $K_2$ good RF beams and there were R beams which were common, the MIMO multiplexing device would first sound on the common R RF beams and then sound in turn on the remaining set of RF beams for user 1 (R-$K_1$) and for user 2 (R-$K_2$).

Another variation of sounding on the different digital pre-coders is that the different digital pre-coders sound different set of sub-carriers at the same time, so that the transmission is staggered in frequency as opposed to be staggered in time.

In other embodiments, the MIMO multiplexing device can use full channel sounding when no initial channel knowledge is available.

If there is no channel knowledge available (neither at RF beam level, or at a finer AoA/AoD level), an alternative procedure may be used to establish which pre-coders are needed for both the RF and baseband for each of the users' streams.

This procedure works to first establish the best. RF beams for the transmitter to receiver link and then sweeps through each of the digital beams inside each of the identified RF beams. (The same procedure can be used for a communication link that works in the opposite direction.) In this way, the best digital and RF pre-coders can be found for each of the required streams to each of the users which are to be supported.

Figure 12:
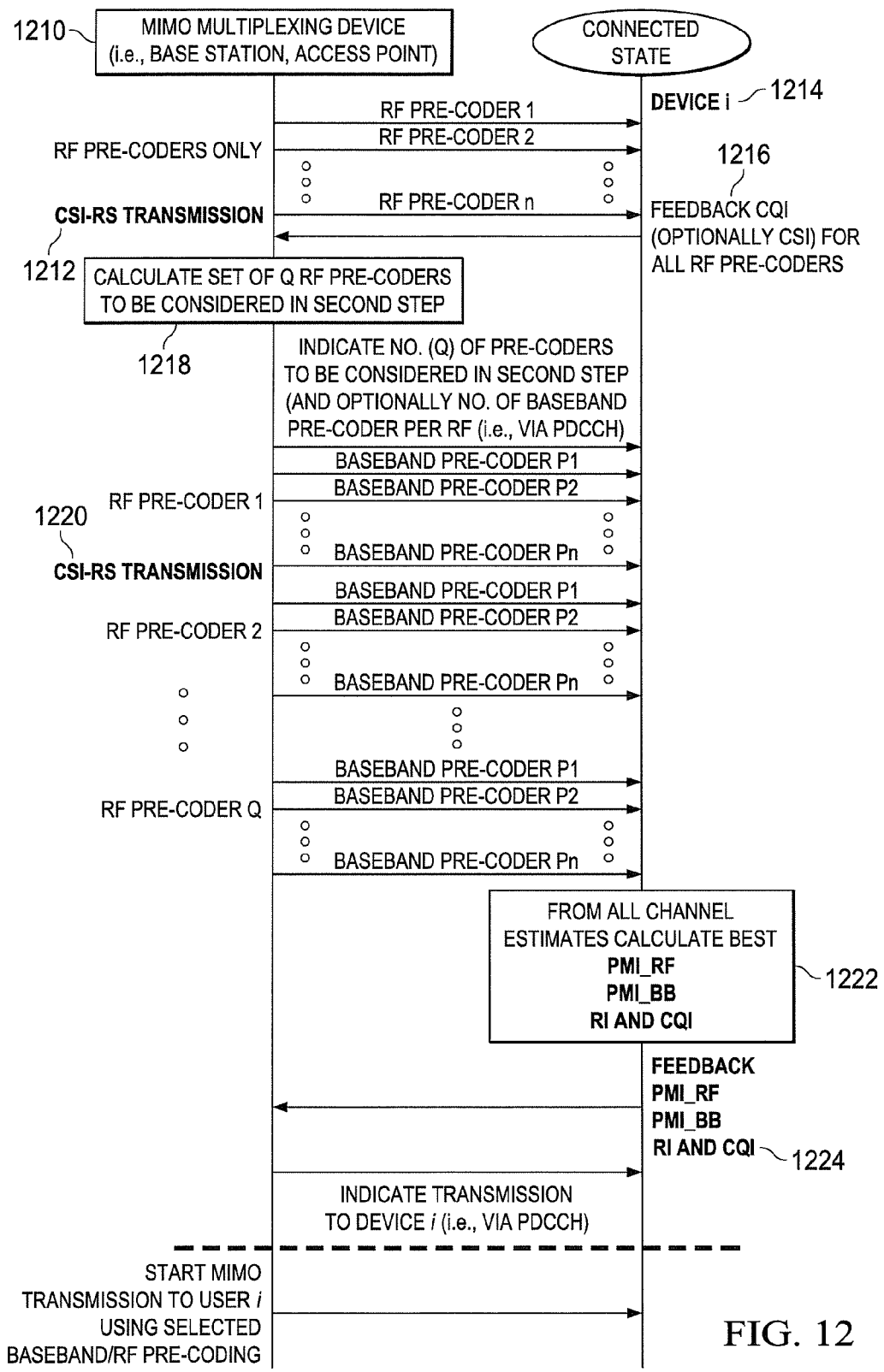
FIG. 12 is a flow diagram illustrating an alternative non-code book method of a MIMO multiplexing device according to an exemplary embodiment of the disclosure.

A possible signaling procedure is for each user i is shown in FIG. 12. In the first step channel state information reference symbols (CSI-RS) 1212 are sent successively from the MIMO multiplexing device 1210 to user i 1214. User i 1214 then feedbacks channel quality information (CQI) 1216 (or optionally channel state information) to the MIMO multiplexing device 1210 for each of the RF pre-coders. The MIMO multiplexing device then makes decisions as to which were the best Q RF pre-coders at 1218.

CSI-RS information is then sent in the second step 1220 to user i by cycling through the different baseband pre-coders for each of the identified Q RF pre-coders. So that user i knows how many CSI-RS symbols to expect in the second phase the number of Q RF pre-coders is first signaled to the user i before the cycling starts. For each of the sent CSI-RS symbols have been sent, the receiver performs channel estimation at 1222 for each combination of RF and digital beams used at the transmitter and for each of its receivers RF beams. The receiver then calculates the best combination of digital and RF pre-coders for different possible ranks and then feedbacks at 1224 to the transmitter the preferred RF pre-coder at the transmitter (as PMI_RF), the preferred digital pre-coder at the transmitter (as PMI_BB), the selected rank (as RI) and the respective channel quality information (as CQI).

Figure 13:
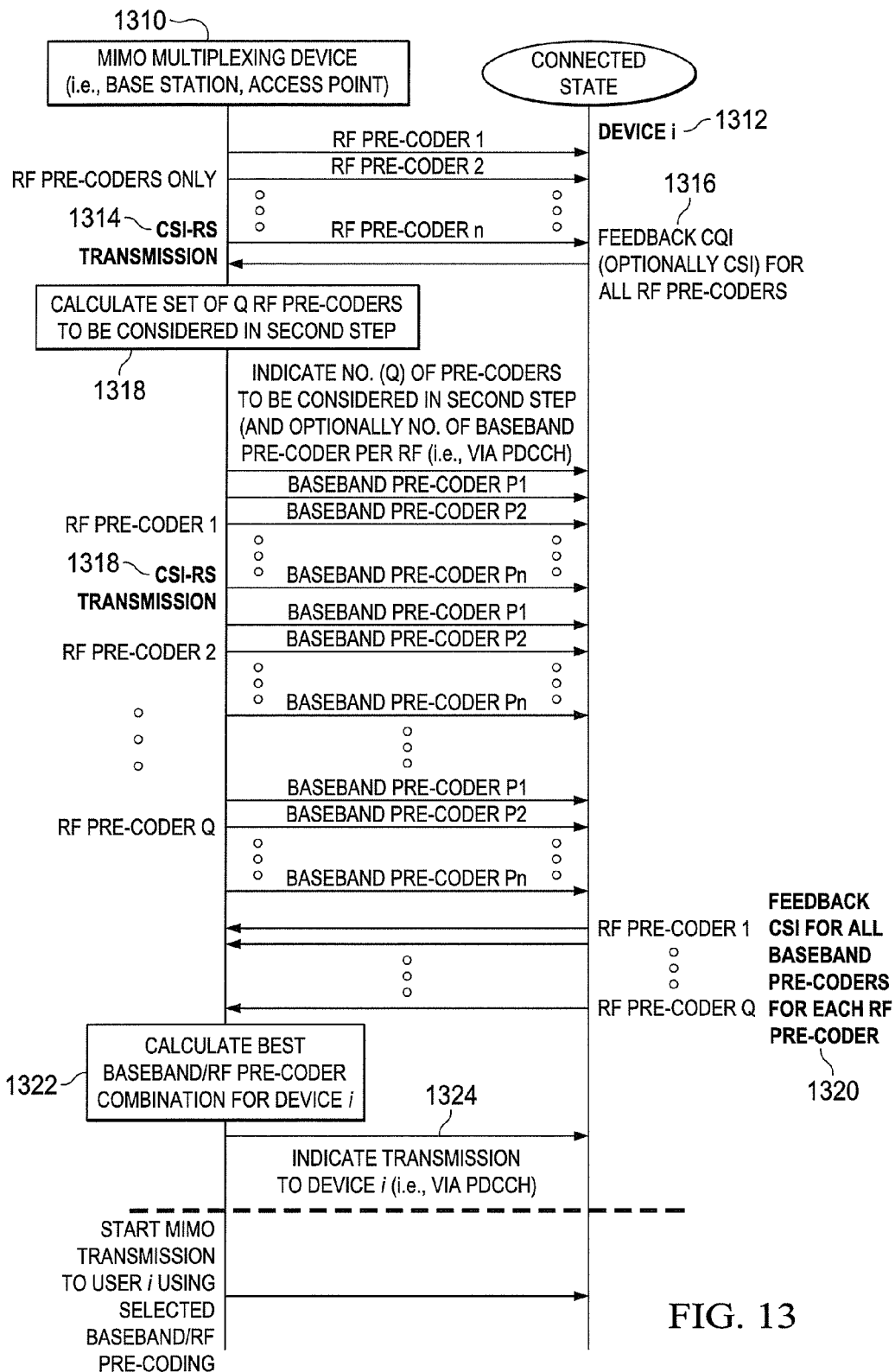
FIG. 13 is a flow diagram illustrating an alternative non-code book method of a MIMO multiplexing device according to an exemplary embodiment of the disclosure.

An alternative is shown in FIG. 13 in which, once all the CSI-RS symbols have been sent 1314, 1318, user i 1312 then feedbacks channel quality information channel state information at 1316, 1320 to the MIMO multiplexing device for each of baseband band pre-coders belonging to each of the Q RF pre-coders. The MIMO multiplexing device 1310 then makes a decision as to which baseband/RF pre-coder combination is the best to use at 1322.

Further variations of this procedure are also possible. In particular if the receiver knows the digital code book for each of the RF beams, it is not required that a CSI-RS is sent on every for every digital pre-coder. A scheme could be adopted as shown in FIG. 6 for the second step of this procedure.

Irrespective of the feedback scheme, the MIMO transmitting device will make the final decision for the final selected digital and RF pre-coder. This may be different to the one requested by the receiving device.

Once the decision has been made by the MIMO multiplexing device, the MIMO multiplexing device signals at 1324 to each of the users via a downlink control channel (i.e. via DPCCH) the selected RF and baseband pre-coder and the rank that will be used for final transmission.

An alternative to signaling the chosen RF and digital code books to the receiver is the use of user specific channel sounding pilots (or user specific reference signals (UE-RS)) which will be also be transmitted using the same selected RF and baseband pre-coders which are used for the data transmission. In this way, the receiving device can obtain channel estimates for each of the chosen RF and digital pre-coders selected for transmission.

In other embodiments, user specific reference signals (UE-RS) may be used for MU-MIMO using hybrid beam-forming. Once the spatial streams for each user have been mapped to the most suitable RF chain and the most suitable digital and RF pre-coders have been found (using either one of the above techniques or an alternative technique), it is essential that the channel quality is measured at regular intervals for each of the MIMO streams being used by each user.

To support such channel sounding (which may be called user specific reference signals) when non-code book MU-MIMO is used in conjunction with hybrid beam forming there are many possibilities since a certain user's streams may all use the same RF chains or they may use different RF chains (see FIG. 2-FIG. 4).

The technique presently adopted in standard systems using digital beam-forming only (i.e. LTE-A [2]) for MU-MIMO is to use different orthogonal sequences (in the time domain) for each co-scheduled MIMO pre-coded signal stream. In this way, the transmitter can use a non-code book based MU-MIMO pre-coder for each stream and the receiver can obtain channel estimates for each MIMO stream.

In the case of LTE these orthogonal sequences (in the time direction) use a dedicated sub-carrier position. Only under certain conditions (i.e. when the required total transmission ranks is greater than a certain limit and the code set is exhausted) is an additional sub-carrier assigned to carry a further set of sequences.

Figure 14:
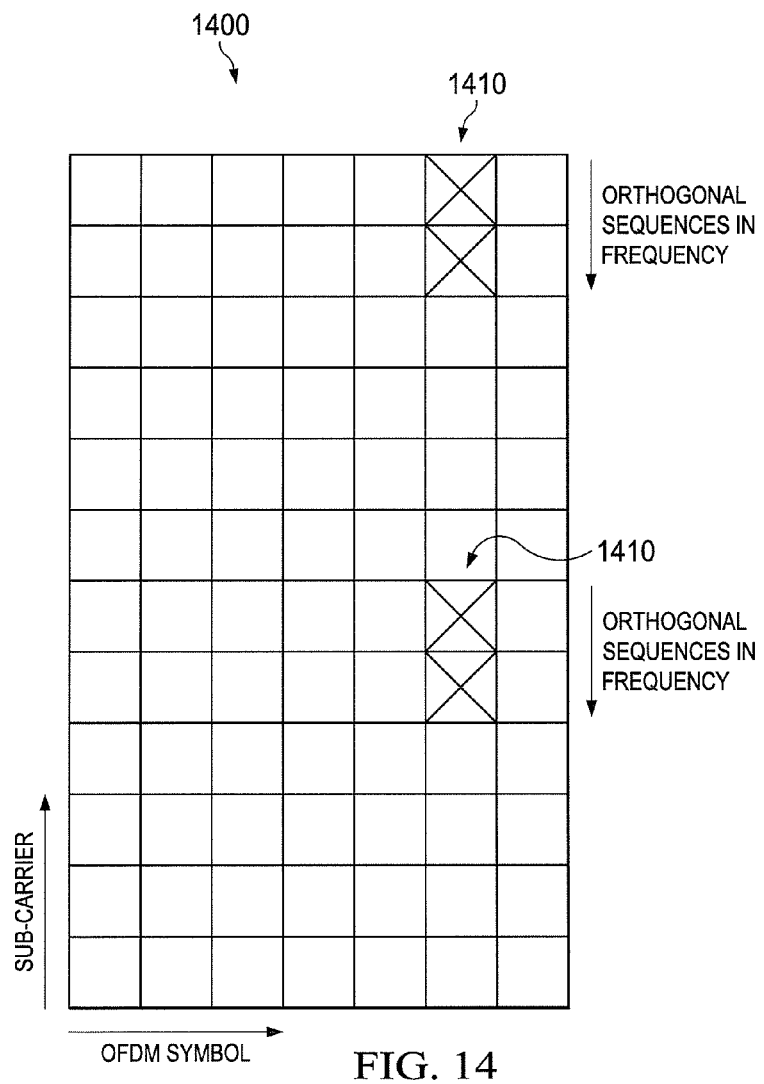
FIG. 14 illustrates a method to support channel sounding for hybrid beam-forming for non-code book MIMO according to an exemplary embodiment of the disclosure.
Figure 15:
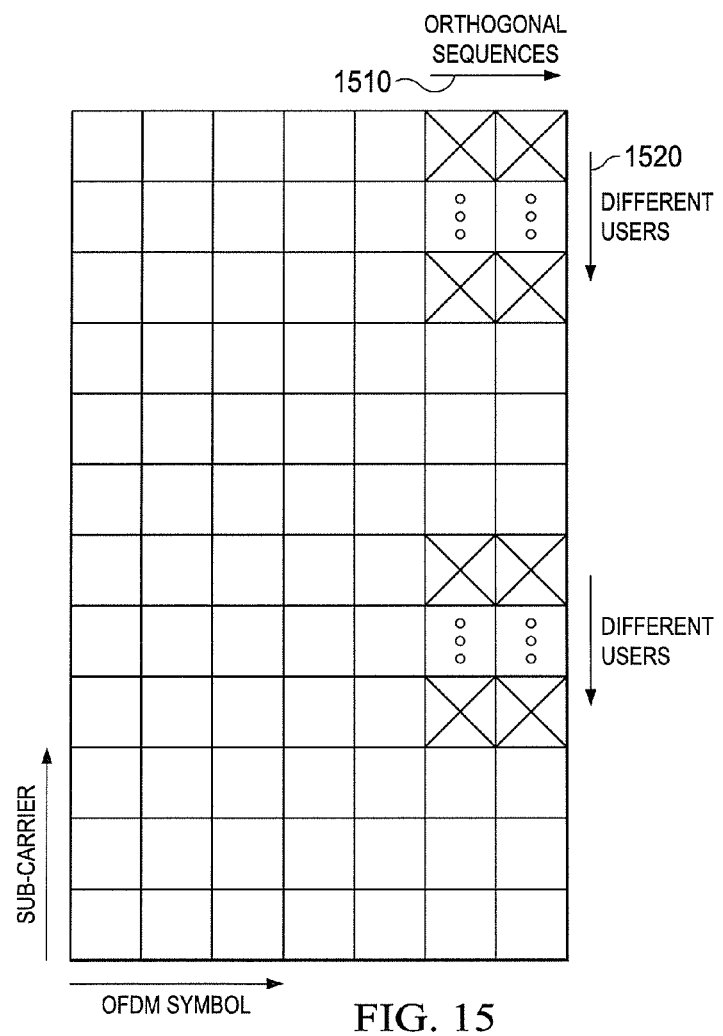
FIG. 15 illustrates an alternative method to support channel sounding for hybrid beam-forming for non-code book MIMO according to an exemplary embodiment of the disclosure.
Figure 16:
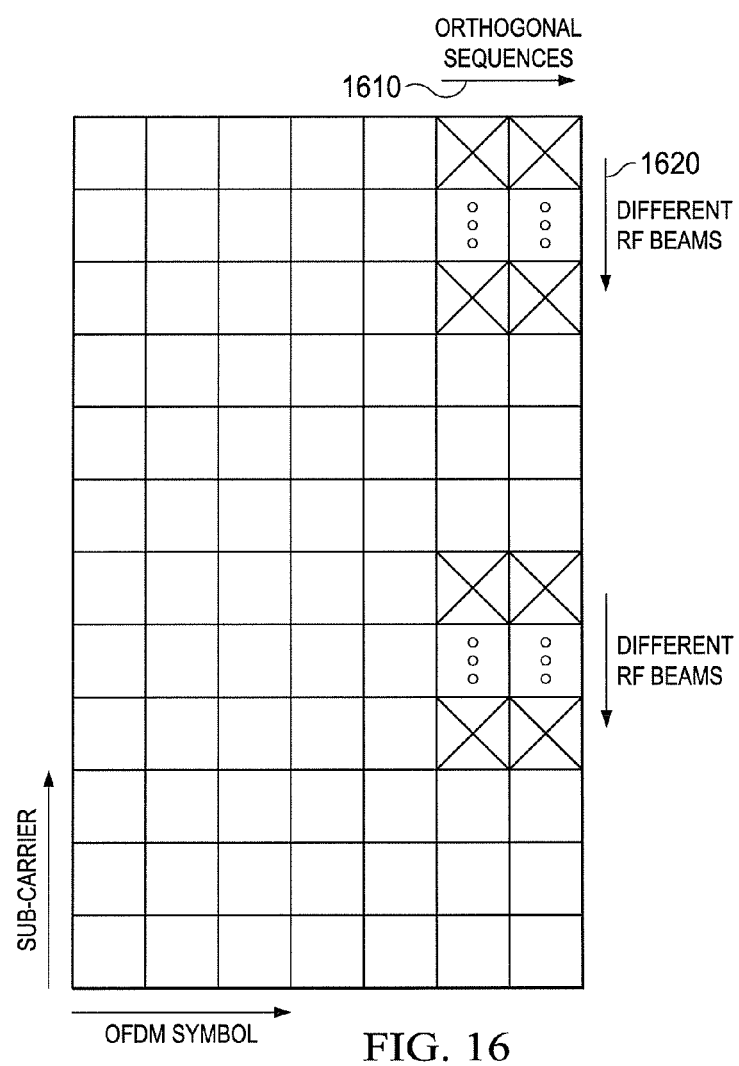
FIG. 16 illustrates an alternative method to support channel sounding for hybrid beam-forming for non-code book MIMO according to an exemplary embodiment of the disclosure.

FIGS. 14 through 16 illustrate methods to support channel sounding for hybrid beam-forming for non-code book MU-MIMO.

In FIG. 14, for the case where the different users' streams are multiplexed in one RF beam (see FIG. 4), the MIMO channel has less dispersion and adjacent carriers channel response are more correlated. Therefore, the method of hybrid beam forming can use orthogonal sequences in the frequency direction 1410. The advantage of using orthogonal sequences in the frequency direction is that the channel estimations from the orthogonal sequences are then less sensitive to the effects of Doppler when the receiver is moving.

So that the receiver knows that the UE-RS is using orthogonal sequences in the frequency direction as opposed to time domain, the use of frequency domains sequences can be signaled using a control channel (i.e. DPCCH).

In FIG. 15, the separate sets of orthogonal sequences 1510 are used for each co-scheduled user streams 1520 (irrespective of which RF chain is used) and these separate sets of sequences are placed on different sub-carriers.

However, since the used position of sequences depends upon how many users are co-scheduled, each user needs to be notified of the sub-carrier position belonging to his streams. These values can be indicated as an offset value from the $1^{st}$ carrier and would be signaled using a control channel (i.e. DPCCH).

In FIG. 16, the separate sets of orthogonal sequences 1610 can be used for different RF beams 1620 and these separate set of sequences are placed on different sub-carriers. To explain further what is meant by RF beams, FIG. 2 and FIG. 3 show cases where 2 RF beams carry the different MIMO streams and FIG. 4 shows as case where the MIMO streams are carried by one RF beam.

Although these different arrangements have been described in isolation, they can also be combined, so for instance Alternative B) could also be used with Alternative A) so that the sequences are placed in the frequency direction and not in the time direction as illustrated in FIG. 15. Other combinations are also possible.

Although this arrangement of orthogonal sequences has a greater overhead compared to the traditional method of using the sequences, it has the advantage that different ranks per user can be more flexibility deployed, since the number of available sequences only depends upon the rank for each user and not on product of the number of co-scheduled and their respective ranks.

Figure 17:
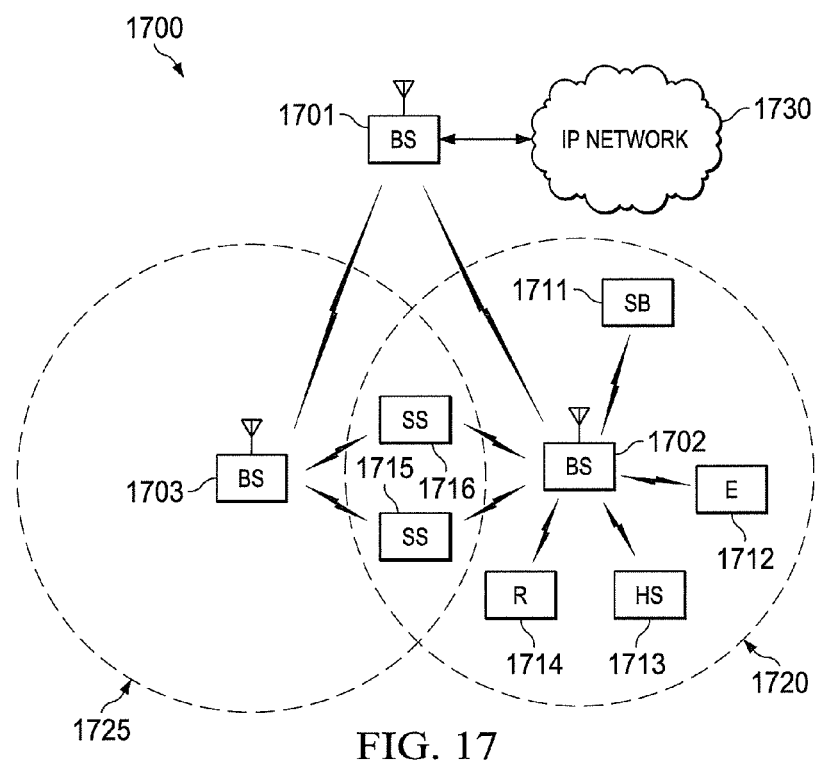
FIG. 17 illustrates a wireless network according to an embodiment of the present disclosure.

FIG. 17 illustrates a wireless network 1700 according to one embodiment of the present disclosure. The embodiment of wireless network 1700 illustrated in FIG. 17 is for illustration only. Other embodiments of wireless network 1700 could be used without departing from the scope of this disclosure.

The wireless network 1700 includes a base station eNodeB (eNB) 1701, eNB 1702, and eNB 1703. The eNB 1701 communicates with eNB 1702 and eNB 1703. The eNB 1701 also communicates with Internet protocol (IP) network 1730, such as the Internet, a proprietary IP network, or other data network.

Depending on the network type, other well-known terms may be used instead of "eNodeB," such as "base station" or "access point". For the sake of convenience, the term "eNodeB" shall be used herein to refer to the network infrastructure components that provide wireless access to remote terminals. In addition, the term "user equipment" or "UE" is used herein to designate any remote wireless equipment that wirelessly accesses an eNB and that can be used by a consumer to access services via the wireless communications network, whether the UE is a mobile device (e.g., cell phone) or is normally considered a stationary device (e.g., desktop personal computer, vending machine, etc.). Other well know terms for the remote terminals include "mobile stations" (MS) and "subscriber stations" (SS), "remote terminal" (RT), "wireless terminal" (WT), and the like.

The eNB 1702 provides wireless broadband access to network 1730 to a first plurality of user equipments (UEs) within coverage area 1720 of eNB 1702. The first plurality of UEs includes UE 1711, which may be located in a small business; UE 1712, which may be located in an enterprise; UE 1713, which may be located in a WiFi hotspot; UE 1714, which may be located in a first residence; UE 1715, which may be located in a second residence; and UE 1716, which may be a mobile device, such as a cell phone, a wireless laptop, a wireless PDA, or the like. UEs 1711-1716 may be any wireless communication device, such as, but not limited to, a mobile phone, mobile PDA and any mobile station (MS).

The eNB 1703 provides wireless broadband access to a second plurality of UEs within coverage area 1725 of eNB 1703. The second plurality of UEs includes UE 1715 and UE 1716. In some embodiments, one or more of eNBs 1701-1703 may communicate with each other and with UEs 1711-1716 using 5G, LTE, LTE-A, or WiMAX techniques including techniques for multi-user and single user MIMO for communication systems using hybrid beam forming as described in embodiments of the present disclosure.

Dotted lines show the approximate extents of coverage areas 1720 and 1725, which are shown as approximately circular for the purposes of illustration and explanation only. It should be clearly understood that the coverage areas associated with base stations, for example, coverage areas 1720 and 1725, may have other shapes, including irregular shapes, depending upon the configuration of the base stations and variations in the radio environment associated with natural and man-made obstructions.

Although FIG. 17 depicts one example of a wireless network 1700, various changes may be made to FIG. 17. For example, another type of data network, such as a wired network, may be substituted for wireless network 1700. In a wired network, network terminals may replace eNBs 1701-1703 and UEs 1711-1716. Wired connections may replace the wireless connections depicted in FIG. 17.

FIG. 18A is a high-level diagram of a wireless transmit path. FIG. 18B is a high-level diagram of a wireless receive path. In FIGS. 18A and 18B, the transmit path 1800 may be implemented, e.g., in eNB 1702 and the receive path 1850 may be implemented, e.g., in a UE, such as UE 1716 of FIG. 17. It will be understood, however, that the receive path 1850 could be implemented in an eNB (e.g. eNB 1702 of FIG. 17) and the transmit path 1800 could be implemented in a UE. In certain embodiments, transmit path 1800 and receive path 1850 are configured to perform multi-user and single user MIMO for communication systems using hybrid beam forming as described in embodiments of the present disclosure.

Transmit path 1800 comprises channel coding and modulation block 1805, serial-to-parallel (S-to-P) block 1810, Size N Inverse Fast Fourier Transform (IFFT) block 1815, parallel-to-serial (P-to-S) block 1820, add cyclic prefix block 1825, up-converter (UC) 1830. Receive path 1850 comprises down-converter (DC) 1855, remove cyclic prefix block 1860, serial-to-parallel (S-to-P) block 1865, Size N Fast Fourier Transform (FFT) block 1870, parallel-to-serial (P-to-S) block 1875, channel decoding and demodulation block 1880.

At least some of the components in FIGS. 18A and 18B may be implemented in software while other components may be implemented by configurable hardware (e.g., a processor) or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 1800, channel coding and modulation block 1805 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 1810 converts (i.e., de-multiplexes) the serial modulated symbols to parallel data to produce N parallel symbol streams where N is the IFFT/FFT size used in eNB 1702 and UE 1716. Size N IFFT block 1815 then performs an IFFT operation on the N parallel symbol streams to produce time-domain output signals. Parallel-to-serial block 1820 converts (i.e., multiplexes) the parallel time-domain output symbols from Size N IFFT block 1815 to produce a serial time-domain signal. Add cyclic prefix block 1825 then inserts a cyclic prefix to the time-domain signal. Finally, up-converter 1830 modulates (i.e., up-converts) the output of add cyclic prefix block 1825 to RF frequency for transmission via a wireless channel. The signal may also be filtered at baseband before conversion to RF frequency.

The transmitted RF signal arrives at UE 1716 after passing through the wireless channel and reverse operations to those at eNB 1702 are performed. Down-converter 1855 down-converts the received signal to baseband frequency and remove cyclic prefix block 1860 removes the cyclic prefix to produce the serial time-domain baseband signal. Serial-to-parallel block 1865 converts the time-domain baseband signal to parallel time domain signals. Size N FFT block 1870 then performs an FFT algorithm to produce N parallel frequency-domain signals. Parallel-to-serial block 1875 converts the parallel frequency-domain signals to a sequence of modulated data symbols. Channel decoding and demodulation block 1880 demodulates and then decodes the modulated symbols to recover the original input data stream.

Each of eNBs 1701-1703 may implement a transmit path that is analogous to transmitting in the downlink to UEs 1711-1716 and may implement a receive path that is analogous to receiving in the uplink from UEs 1711-1716. Similarly, each one of UEs 1711-1716 may implement a transmit path corresponding to the architecture for transmitting in the uplink to eNBs 1701-1703 and may implement a receive path corresponding to the architecture for receiving in the downlink from eNBs 1701-1703.

Figure 19:
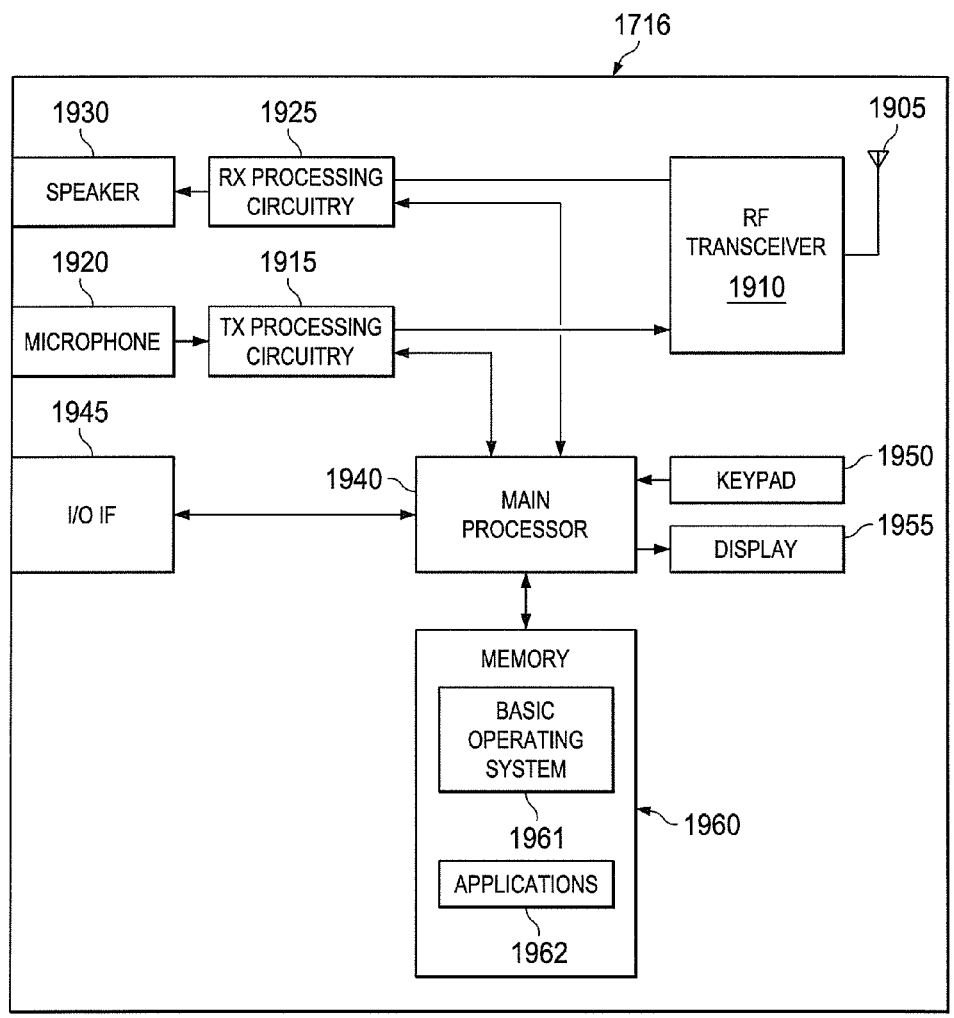
FIG. 19 illustrates a subscriber station according to an exemplary embodiment of the disclosure.

FIG. 19 illustrates a subscriber station according to embodiments of the present disclosure. The embodiment of subscribe station, such as UE 1716, illustrated in FIG. 19 is for illustration only. Other embodiments of the wireless subscriber station could be used without departing from the scope of this disclosure.

UE 1716 comprises antenna 1905, radio frequency (RF) transceiver 1910, transmit (TX) processing circuitry 1915, microphone 1920, and receive (RX) processing circuitry 1925. Although shown as a single antenna, antenna 1905 can include multiple antennas for MIMO configurations. UE 1716 also comprises speaker 1930, main processor 1940, input/output (I/O) interface (IF) 1945, keypad 1950, display 1955, and memory 1960. Memory 1960 further comprises basic operating system (OS) program 1961 and a plurality of applications 1962. The plurality of applications can include one or more of resource mapping tables (e.g., in FIGS. 14-16 described in further detail herein above).

Radio frequency (RF) transceiver 1910 receives !from antenna 1905 an incoming RF signal transmitted by a base station of wireless network 1700. Radio frequency (RF) transceiver 1910 down-converts the incoming RF signal to produce an intermediate frequency (IF) or a baseband signal. The IF or baseband signal is sent to receiver (RX) processing circuitry 1925 that produces a processed baseband signal by filtering, decoding, and/or digitizing the baseband or IF signal. Receiver (RX) processing circuitry 1925 transmits the processed baseband signal to speaker 1930 (i.e., voice data) or to main processor 1940 for further processing (e.g., web browsing).

Transmitter (TX) processing circuitry 1915 receives analog or digital voice data from microphone 1920 or other outgoing baseband data (e.g., web data, e-mail, interactive video game data) from main processor 1940. Transmitter (TX) processing circuitry 1915 encodes, multiplexes, and/or digitizes the outgoing baseband data to produce a processed baseband or IF signal. Radio frequency (RF) transceiver 1910 receives the outgoing processed baseband or IF signal from transmitter (TX) processing circuitry 1915. Radio frequency (RF) transceiver 1910 up-converts the baseband or IF signal to a radio frequency (RF) signal that is transmitted via antenna 1905. This simplified schematic including Rx processing circuitry 1925, Tx processing circuitry 1915, RF transceiver 1910, and antenna 1905 may be embodied by any of the configurations illustrated in FIGS. 1-4, for example.

In certain embodiments, main processor 1940 is a microprocessor or microcontroller. Memory 1960 is coupled to main processor 1940. According to some embodiments of the present disclosure, part of memory 1960 comprises a random access memory (RAM) and another part of memory 1960 comprises a Flash memory, which acts as a read-only memory (ROM).

Main processor 1940 executes basic operating system (OS) program 1961 stored in memory 1960 in order to control the overall operation of wireless subscriber station 1716. In one such operation, main processor 1940 controls the reception of forward channel signals and the transmission of reverse channel signals by radio frequency (RF) transceiver 1910, receiver (RX) processing circuitry 1925, and transmitter (TX) processing circuitry 1915, in accordance with well-known principles.

Main processor 1940 is capable of executing other processes and programs resident in memory 1960, such as operations for multi-user and single user MIMO for communication systems using hybrid beam forming as described in embodiments of the present disclosure. Main processor 1940 can move data into or out of memory 1960, as required by an executing process. In some embodiments, the main processor 1940 is configured to execute a plurality of applications 1962, such as applications for CoMP communications and MU-MIMO communications. The main processor 1940 can operate the plurality of applications 1962 based on OS program 1961 or in response to a signal received from BS 1702. Main processor 1940 is also coupled to I/O interface 1945. I/O interface 1945 provides subscriber station 1716 with the ability to connect to other devices such as laptop computers and handheld computers. I/O interface 1945 is the communication path between these accessories and main controller 1940.

Main processor 1940 is also coupled to keypad 1950 and display unit 1955. The operator of subscriber station 1716 uses keypad 1950 to enter data into subscriber station 1716. Display 1955 may be a liquid crystal display capable of rendering text and/or at least limited graphics from web sites. Alternate embodiments may use other types of displays.

Embodiments of the present disclosure provide methods and apparatus for multi-user and single user MIMO for communication systems using hybrid beam forming in a system where both the BS and MSs have access to multiple antennas. For the purpose of illustration, embodiments of the present disclosure use the term beamform and RF envelope to distinguish the spatial signature of the different kind of beams that can be formed for transmission and reception. The term beamform and RF envelope should be construed to include other possible descriptions of beam patterns including, for example, codebooks (of possibly different sizes), non-codebook radiation patterns, and directional gain associated with a particular beam pattern.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A station in a wireless communication system, comprising:
   a processor circuitry configured to form at least a first plurality of data streams and a second plurality of data streams;
   a digital precoder configured to receive the first plurality of data streams and the second plurality of data streams;
   a plurality of radio frequency (RF) beamforming chains connected to the digital precoder and configured to form at least one RF beam envelope, wherein the digital precoder is configured to steer a plurality of digital beams within the at least one RF beam envelope, the digital beams forming a plurality of spatially distinct paths for the first plurality of data streams and a plurality of spatially distinct paths for the second plurality of data streams; and
   a plurality of antennas operably connected to the RF beamforming chains;
   wherein the RF beamforming chains are configured to form the at least one RF beam envelope for the first plurality of data streams, and at least a second RF beam envelope for the second plurality of data streams.

2. The station according to claim 1, further comprising an inverse fast Fourier transform circuit connected between the digital precoder and the plurality of RF beamforming chains.

3. The station according to claim 1, wherein the digital precoder is configured to steer the plurality of digital beams in a path within one RF beam envelope to at least a second station.

4. The station according to claim 1, wherein the digital precoder is configured to steer a first plurality of digital beams within a first of the at least one RF beam envelopes to a second station and a third station, and a second plurality of digital beams within a second RF beam envelope to the second station and the third station.

5. The station according to claim 1, wherein the digital precoder is configured to steer a first plurality of digital beams within a first of the at least one RF beam envelopes to a second station, and a second plurality of digital beams within a second RF beam envelope to a third station.

6. The station according to claim 1, wherein the processing circuitry maps the first plurality of data streams and the second plurality of data streams to the digital precoder and to the RF beamforming chains using estimates of at least a first angle of departure (AoD) and a second AoD of the first plurality of digital beams to a second station and a third AoD and a fourth AoD of the second plurality of digital beams to a third station.

7. The station according to claim 6, wherein the processing circuitry maps the first plurality of data streams and the second plurality of data streams to the digital precoder and to the RF beamforming chains using estimates of a power of the first plurality of digital beams to the second station and a power of the second plurality of digital beams to the third station.

8. The station according to claim 1, wherein the RF beamforming chains are configured to form the at least one RF beam envelope according to a codebook of beams.

9. The station according to claim 1, wherein a first data stream and a third data stream are sent to a second station using a same frequency and a same timeslot over first and third spatially distinct paths, respectively, and a second data stream and a fourth data stream are sent to a third station using the same frequency and the same timeslot over second and fourth spatially distinct paths, respectively.

10. The station according to claim 9, wherein the RF precoder is configured to form at least a third RF beam envelope for at least a fifth data stream and a sixth data stream, and at least a second RF beam envelope for a seventh data stream and at least an eighth data stream, wherein the fifth data stream and the sixth data stream are sent to a fourth station using a same frequency and a same timeslot over fifth and sixth spatially distinct paths, and the seventh data stream and the eighth data stream are sent to a fifth station using the same frequency and the same timeslot over seventh and eighth spatially distinct paths.

11. The station of claim 9, wherein the station is a base station, and the second station is a user equipment.

12. The station of claim 9, wherein the station is a user equipment, and the second station is a user station.

13. A method for use in a wireless network, the method comprising:
   transmitting from a first station a channel state information reference signal (CSI-RS) from a multiple input multiple output (MIMO) multiplexing device through a plurality of baseband precoders for each of a plurality of radio frequency (RF) precoders;
   transmitting an indication of a selected baseband precoder and RF precoder combination to a second station; and
   transmitting a MIMO data stream to the second station using the selected baseband precoder and RF precoder combination.

14. The method of claim 13 further comprising, prior to the transmitting an indication:
   receiving from the second station channel state information (CSI) for each of the baseband precoders and each of the RF precoders;
   calculating an optimal baseband precoder and a RF precoder combination for the second station.

15. The method of claim 13 further comprising, prior to transmitting an indication:
   receiving from the second station a preferred baseband precoder (PMI_BB) and a preferred RF precoder (PMI_RF) combination for the second station.

16. The method of claim 13, wherein the CSI-RS use multiple orthogonal spreading codes.

17. A method for use in a wireless network, the method comprising:
   transmitting from a first station a channel state information reference signal (CSI-RS) from a multiple input multiple output (MIMO) multiplexing device for a plurality of radio frequency (RF) precoders;
   transmitting an indication of a selected baseband precoder and RF precoder combination to a second station; and
   transmitting a MIMO data stream to the second station using the selected baseband precoder and RF precoder combination.

18. The method of claim 17, further comprising, prior to said transmitting an indication:

receiving feedback from the second station comprising an indication of a preferred RF precoder (PMI_RF) and an indication of a preferred baseband precoder (PMIBB).

19. The method of claim 18, wherein the feedback of the PMI_BB is performed on one of a periodic and an aperiodic timing and one of wideband or sub-band, and the feedback of the PMI_RF is performed on one of a periodic basis and an aperiodic basis.

20. The method of claim 18, wherein the feedback further includes a rank indication (RI), and channel quality indication (CQI).

21. The method of claim 20, wherein the CQI and RI feedback is performed on one of a periodic and an aperiodic timing and on one of a wideband or sub-band basis.

22. The method of claim 17 further comprising, prior to transmitting an indication:
receiving feedback from the second station comprising a channel state indicator (CSI) for each RF precoder; and
selecting an optimal baseband precoder and a RF precoder combination for the second station based on the CSI and a baseband codebook.

23. The method of claim 17 further comprising, prior to said transmitting an indication:
receiving feedback from the second station comprising a channel state indicator (CSI) for each RF precoder;
calculating a reduced set of RF precoders based on the CSI feedback;
transmitting an indication of the reduced set of RF procoders to the second station;
transmitting from the first station the channel state information reference signal (CSI-RS) from the multiple input multiple output (MIMO) multiplexing device for the reduced set of radiofrequency (RF) precoders; and
selecting an optimal baseband precoder and a RF precoder combination for the second station based on the CSI and a baseband codebook.

* * * * *